US010664025B2

(12) United States Patent
Sato et al.

(10) Patent No.: US 10,664,025 B2
(45) Date of Patent: May 26, 2020

(54) INFORMATION PROCESSING DEVICE

(71) Applicant: FUJITSU CLIENT COMPUTING LIMITED, Kawasaki-shi, Kanagawa (JP)

(72) Inventors: Ryohei Sato, Kawasaki (JP); Ushio Oshima, Kawasaki (JP); Akira Saito, Kawasaki (JP); Makoto Furukawa, Kawasaki (JP)

(73) Assignee: FUJITSU CLIENT COMPUTING LIMITED (JP)

(*) Notice: Subject to any disclaimer, the term of this patent is extended or adjusted under 35 U.S.C. 154(b) by 0 days.

(21) Appl. No.: 16/426,071

(22) Filed: May 30, 2019

(65) Prior Publication Data
US 2019/0278342 A1 Sep. 12, 2019

Related U.S. Application Data

(63) Continuation of application No. PCT/JP2017/046894, filed on Dec. 27, 2017.

(30) Foreign Application Priority Data

Jan. 20, 2017 (JP) .................. 2017-008726

(51) Int. Cl.
*G06F 1/16* (2006.01)
*G06F 1/18* (2006.01)
(Continued)

(52) U.S. Cl.
CPC ............ *G06F 1/187* (2013.01); *G06F 1/16* (2013.01); *G11B 33/124* (2013.01); *G11B 33/128* (2013.01); *H05K 5/02* (2013.01)

(58) Field of Classification Search
CPC .................. G06F 1/1658; G06F 1/187
(Continued)

(56) References Cited

U.S. PATENT DOCUMENTS 4,960,384 A * 10/1990 Singer ............... G06F 1/184
361/679.37
5,100,215 A * 3/1992 Cooke ............... G06F 1/181
312/257.1
(Continued)

FOREIGN PATENT DOCUMENTS

JP  04-056194 A  2/1992
JP  10-143281 A  5/1998
(Continued)

OTHER PUBLICATIONS

International Search Report for Patent Application No. PCT/JP2017/046894 dated Apr. 10, 2018 (3 pages).

*Primary Examiner* — Anthony Q Edwards
(74) *Attorney, Agent, or Firm* — Harness, Dickey & Pierce, P.L.C.

(57) ABSTRACT

An information processing device includes a rail member that is attached to a drive unit, a drive case into which the drive unit having the rail member attached thereto is inserted, and a bar member that includes a locking portion. An opening is formed in the rail member, an opening is formed at a position in the drive case corresponding to the opening of the rail member, and the locking portion of the bar member is inserted into the opening of the rail member and the opening of the drive case in a state in which the drive unit is inserted into a predetermined position of the drive case.

6 Claims, 40 Drawing Sheets

(51) Int. Cl.
*G11B 33/12* (2006.01)
*H05K 5/02* (2006.01)

(58) Field of Classification Search
USPC .............. 361/679.37, 679.39, 726, 727
See application file for complete search history.

(56) References Cited

U.S. PATENT DOCUMENTS

| | | | | |
|---|---|---|---|---|
| 5,737,189 | A * | 4/1998 | Kammersgard | G06F 1/18 |
| | | | | 312/107.5 |
| 5,947,571 | A * | 9/1999 | Ho | G06F 1/184 |
| | | | | 312/223.2 |
| 6,018,457 | A * | 1/2000 | Mroz | G06F 1/184 |
| | | | | 361/679.31 |
| 6,069,789 | A | 5/2000 | Jung | |
| 6,272,013 | B2 * | 8/2001 | Negishi | H05K 7/20581 |
| | | | | 312/236 |
| 6,276,041 | B1 * | 8/2001 | Boe | G06F 1/184 |
| | | | | 29/446 |
| 6,885,550 | B1 * | 4/2005 | Williams | G06F 1/184 |
| | | | | 312/223.1 |
| 7,731,524 | B2 * | 6/2010 | Dittus | H05K 7/1492 |
| | | | | 361/727 |
| 2012/0268870 | A1 | 10/2012 | Ishikawa | |

FOREIGN PATENT DOCUMENTS

| | | |
|---|---|---|
| JP | 2004-039084 A | 2/2004 |
| JP | 2006-302353 A | 11/2006 |
| JP | 2009-116995 A | 5/2009 |
| JP | 2009-169994 A | 7/2009 |
| JP | 2012-230728 A | 11/2012 |
| WO | WO-2008/035410 A1 | 3/2008 |

* cited by examiner

INFORMATION PROCESSING DEVICE

This application is a continuation application based on a PCT International Application No. PCT/JP2017/046894, filed on Dec. 27, 2017, whose priority is claimed on Japanese Patent Application No. 2017-008726, filed Jan. 20, 2017. The entire contents of both the above PCT International Application and the above Japanese Application are incorporated herein by reference.

FIELD OF THE INVENTION

The present invention relates to an information processing device.

DESCRIPTION OF RELATED ART

A desktop personal computer (PC) to which a detachable hard disk drive (HDD) unit or the like is attached as an information storage medium is known, for example, as shown in Japanese Unexamined Patent Application, First Publication No. 2009-169994, Japanese Unexamined Patent Application, First Publication No. 2004-039084, Japanese Unexamined Patent Application, First Publication No. 2009-116995 or Japanese Unexamined Patent Application, First Publication No. Hei4-056194. In such an HDD unit, an HDD is accommodated in a box, and a case in which a drive unit such as the HDD unit is inserted is provided in the PC. This case corresponds to the size of a 5-inch drive such as an HDD unit or a CD/DVD drive, and a 5-inch bay to which the 5-inch drive is attached is provided in the case. This case is installed on the front side of the PC, and the drive unit such as the HDD unit is inserted into a predetermined 5-inch bay of the case from the front side of the PC and is then fixed thereto by a screw.

SUMMARY OF THE INVENTION

In the above-mentioned method, the HDD unit needs to be fixed to the case installed in the PC with a screw, and a lot of time is required due to a large number of work processes when an HDD unit is additionally installed or the HDD unit is exchanged.

Accordingly, there is demand for additionally installing or exchanging a drive unit such as an HDD unit in a short amount of time with a smaller number of work processes in an information processing device.

According to an aspect of the invention, an information processing device includes a rail member that is attached to a drive unit, a drive case into which the drive unit having the rail member attached thereto is inserted, and a bar member that includes a locking portion, wherein an opening is formed in the rail member, an opening is formed at a position in the drive case corresponding to the opening of the rail member, and the locking portion of the bar member is inserted into the opening of the rail member and the opening of the drive case in a state in which the drive unit is inserted into a predetermined position of the drive case.

BRIEF DESCRIPTION OF THE INVENTION

Embodiments of the present invention will be described below. The same elements and the like will be referred by the same reference signs and description thereof will not be repeated.

First Embodiment

Figure 1:
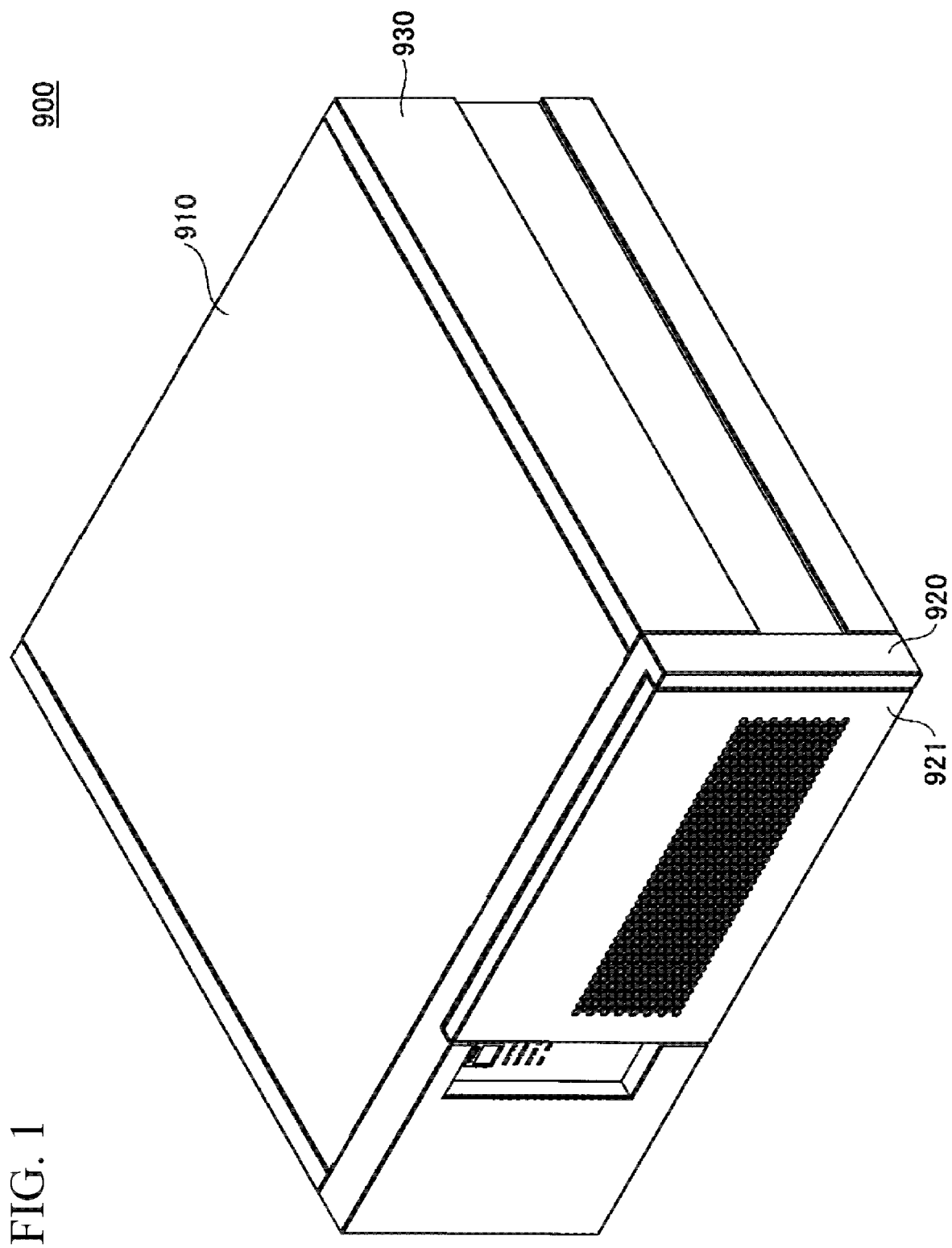
FIG. 1 is a perspective view (1) showing an appearance of an information processing device.
Figure 2:
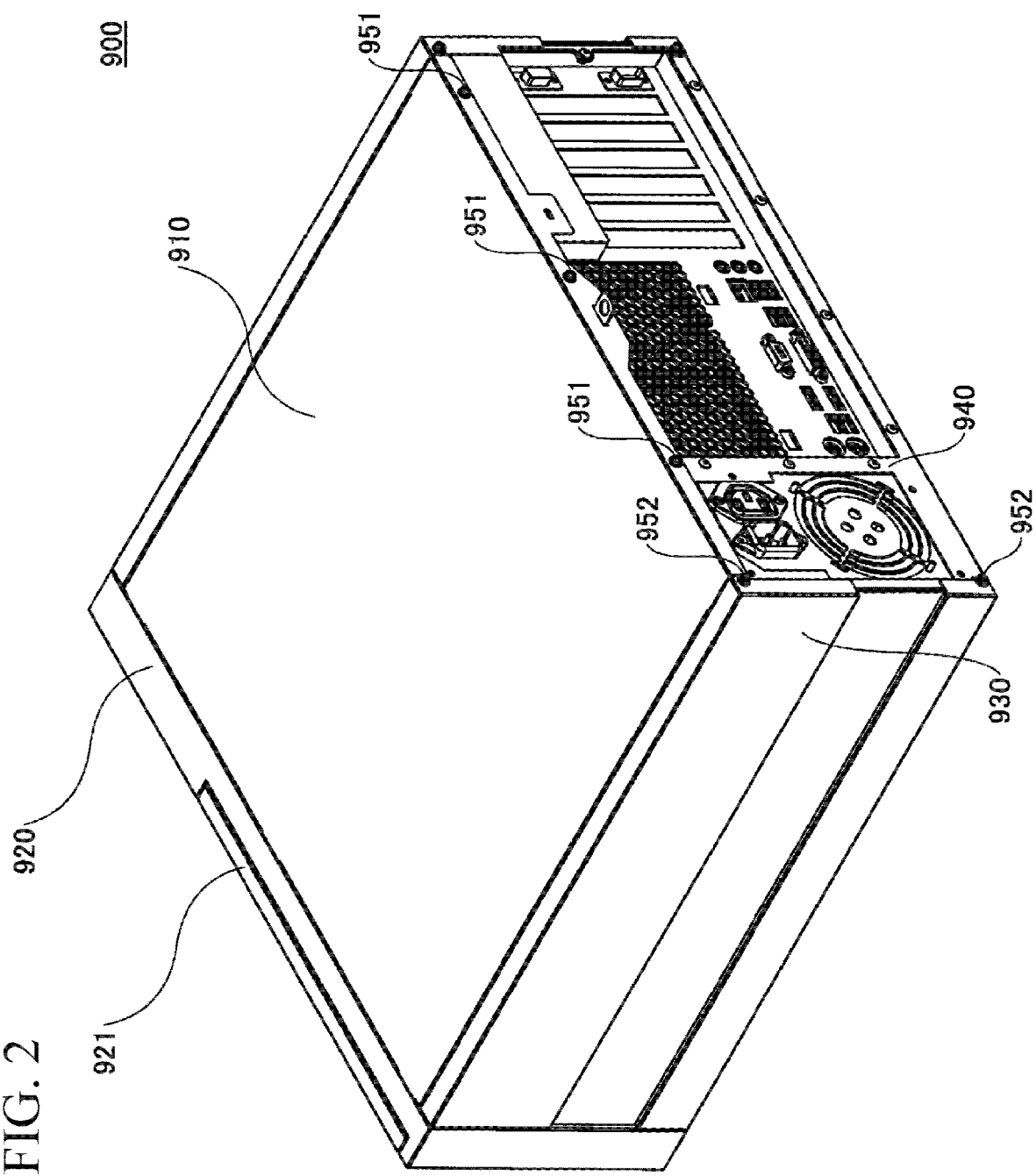
FIG. 2 is a perspective view (2) showing the appearance of the information processing device.

First, a case in which an HDD unit which is attached to a drive case of a PC by screwing is detached will be described. As shown in FIGS. 1 and 2, a PC 900 is covered with a housing such as a top cover 910, a front cover 920 in which a lid 921 is provided, a side cover 930, and a rear cover 940. FIG. 1 is a perspective view from the front side of the PC and FIG. 2 is a perspective view from the rear side thereof.

When an HDD unit attached to the PC 900 is intended to be detached, the top cover 910 is first detached. Specifically, the top cover 910 is screwed to the rear cover 940 with three screws 951, and can be detached by removing the three screws 951 and sliding the top cover 910 rearward. Then, the front cover 920 is detached. The front cover 920 is screwed to a main body of the PC 900 with a plurality of screws. Since these screws become visible when the top cover 910 is detached, the front cover 920 is detached by removing the screws after detaching the top cover 910. Then, the side cover 930 is detached. The side cover 930 is screwed to the rear cover 940 with two screws 952 and is screwed to the main body of the PC 900 with a screw that becomes visible when the top cover 910 is detached. Accordingly, after the top cover 910 has been detached, the side cover 930 is detached by removing the screw that becomes visible when the top cover 910 is detached and the two screws 952.

Figure 3:
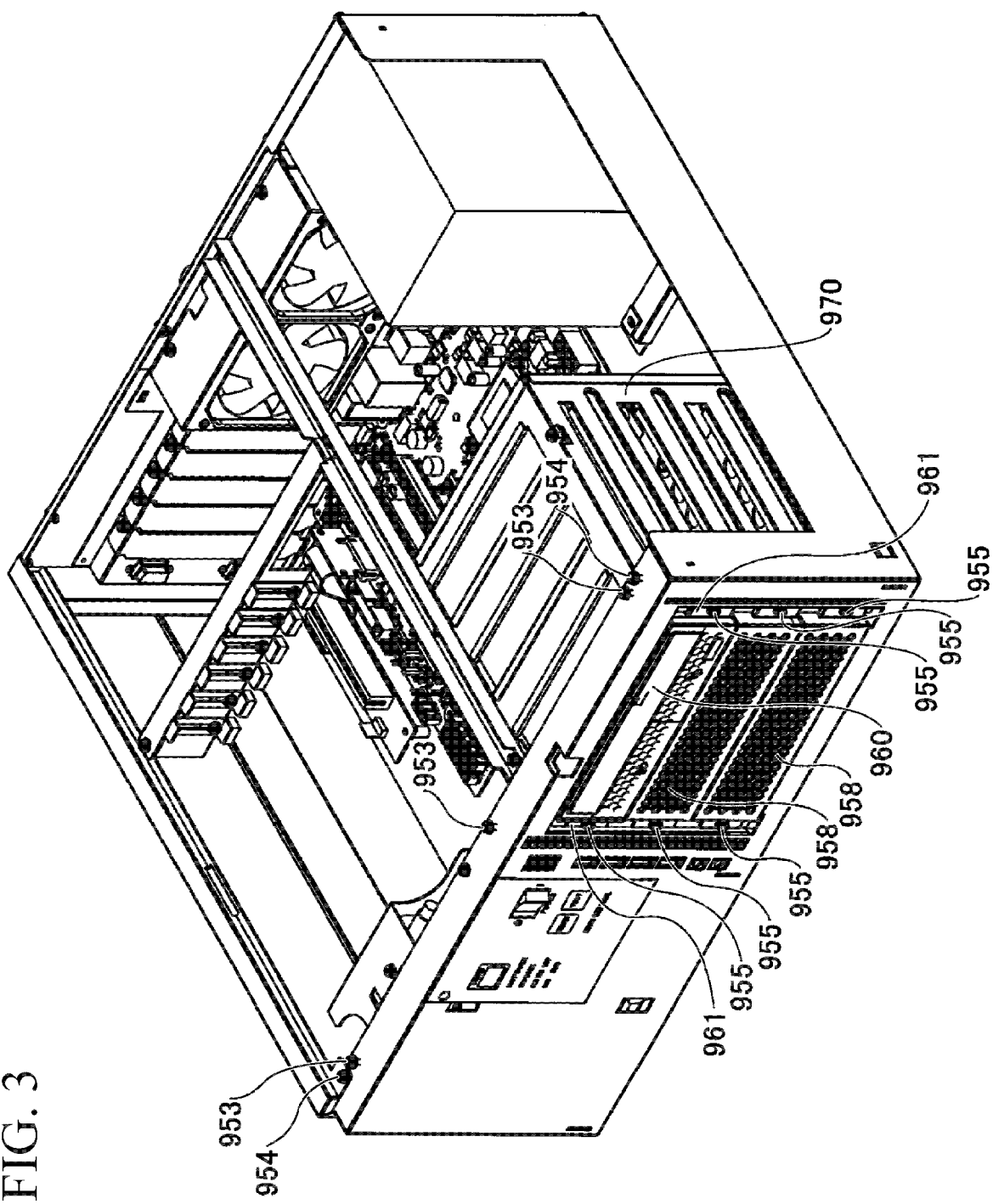
FIG. 3 is a diagram (1) showing a process of detaching an HDD unit in the information processing device.

FIG. 3 is a perspective view showing a state in which the top cover 910, the front cover 920, and one of the side covers 930 have been detached from the PC 900. In FIG. 3, the screws 953 for attaching the front cover 920 and the screws 954 for attaching the side cover 930 which are screws exposed by detaching the top cover 910 are shown for the purpose of convenience. When the top cover 910, the front cover 920, and the side cover 930 are detached in this way, an HDD unit 960 and a drive case 970 in which the HDD unit 960 is accommodated become visible. In the drive case 970, for example, three 5-inch drive units such as the HDD unit 960 and a CD/DVD drive can be attached to attachment places which are called 5-inch bays or the like as shown in FIG. 3.

Figure 4:
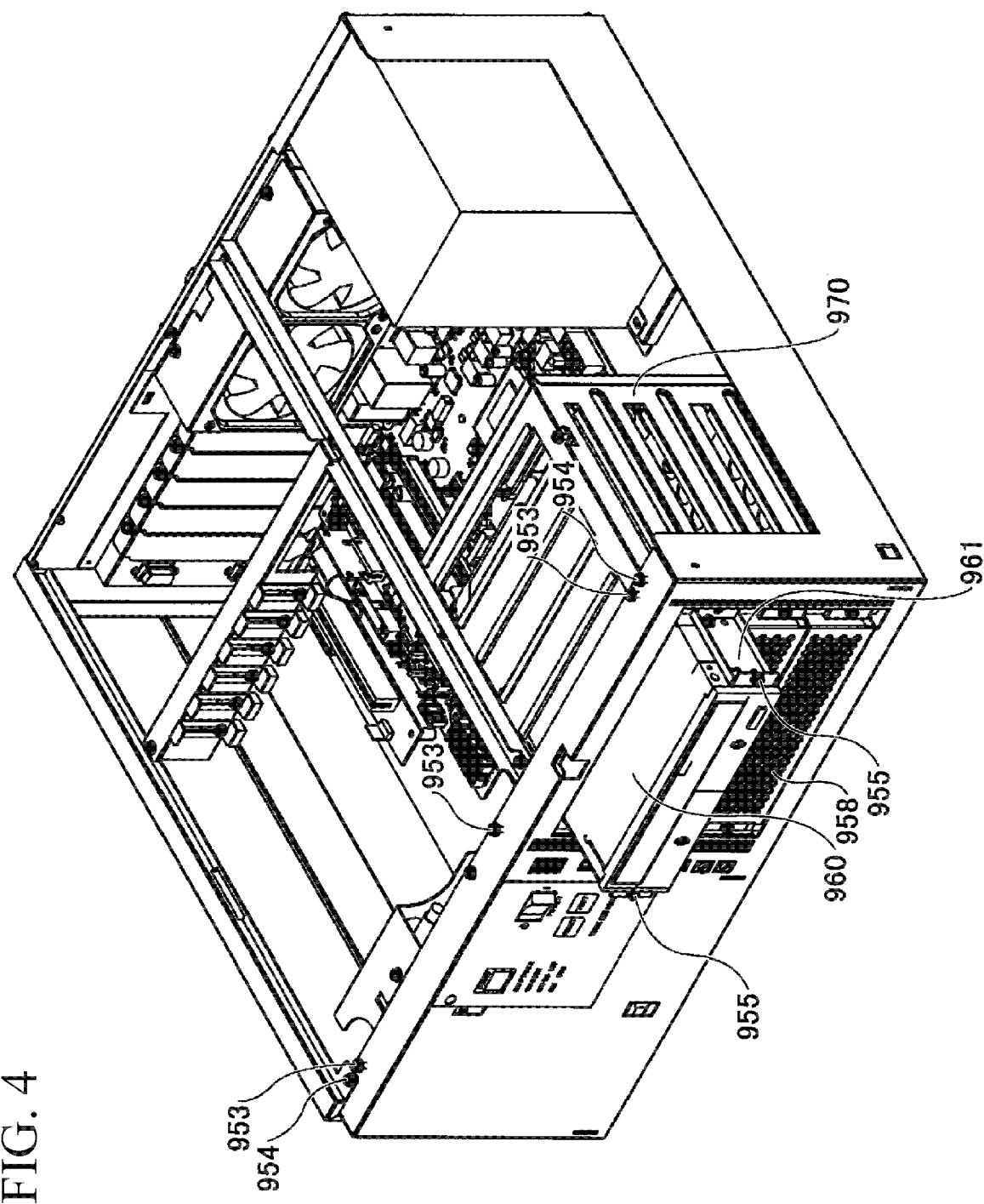
FIG. 4 is a diagram (2) showing a process of detaching an HDD unit in the information processing device.

A rail member 961 is attached to the HDD unit 960. In a state in which the HDD unit 960 having the rail member 961 attached thereto is inserted into a predetermined attachment place of the drive case 970, the rail member 961 is screwed to the drive case 970 with two screws 955 on the front side thereof. Accordingly, unless the two screws 955 are removed, the HDD unit 960 cannot be detached from the drive case 970 as shown in FIG. 4.

Accordingly, when the HDD unit 960 is exchanged, the top cover 910, the front cover 920, and the like are detached, the two screws 955 are then removed, and the HDD unit 960 having the rail member 961 attached thereto is taken out from the drive case 970. Thereafter, another HDD unit is inserted into the attachment place of the drive case 970 and work processes are performed in the reverse order. Accordingly, exchange of the HDD unit 960 requires a lot of time due to the large number of work processes.

FIG. 3 shows a state in which the HDD unit 960 is attached to one of three attachment places of the drive case 970 and a drive unit or the like is not attached to two remaining attachment places but dummies 958 are attached thereto. Regarding the dummies 958, similarly, rails and the like attached to the dummies 958 are attached to the front side of the drive case 970 with the two screws 955. Accordingly, when an HDD unit is additionally installed, the top cover 910, the front cover 920, and the like are detached, the two screws 955 are then removed, the dummies 958 are detached, the new HDD unit is inserted into the attachment place of the drive case 970, and work processes are performed in the reverse order. Accordingly, additional installation of an HDD unit 960 requires a lot of time due to a large number of work processes.

(Drive Case and Bar Member)

Figure 5A:
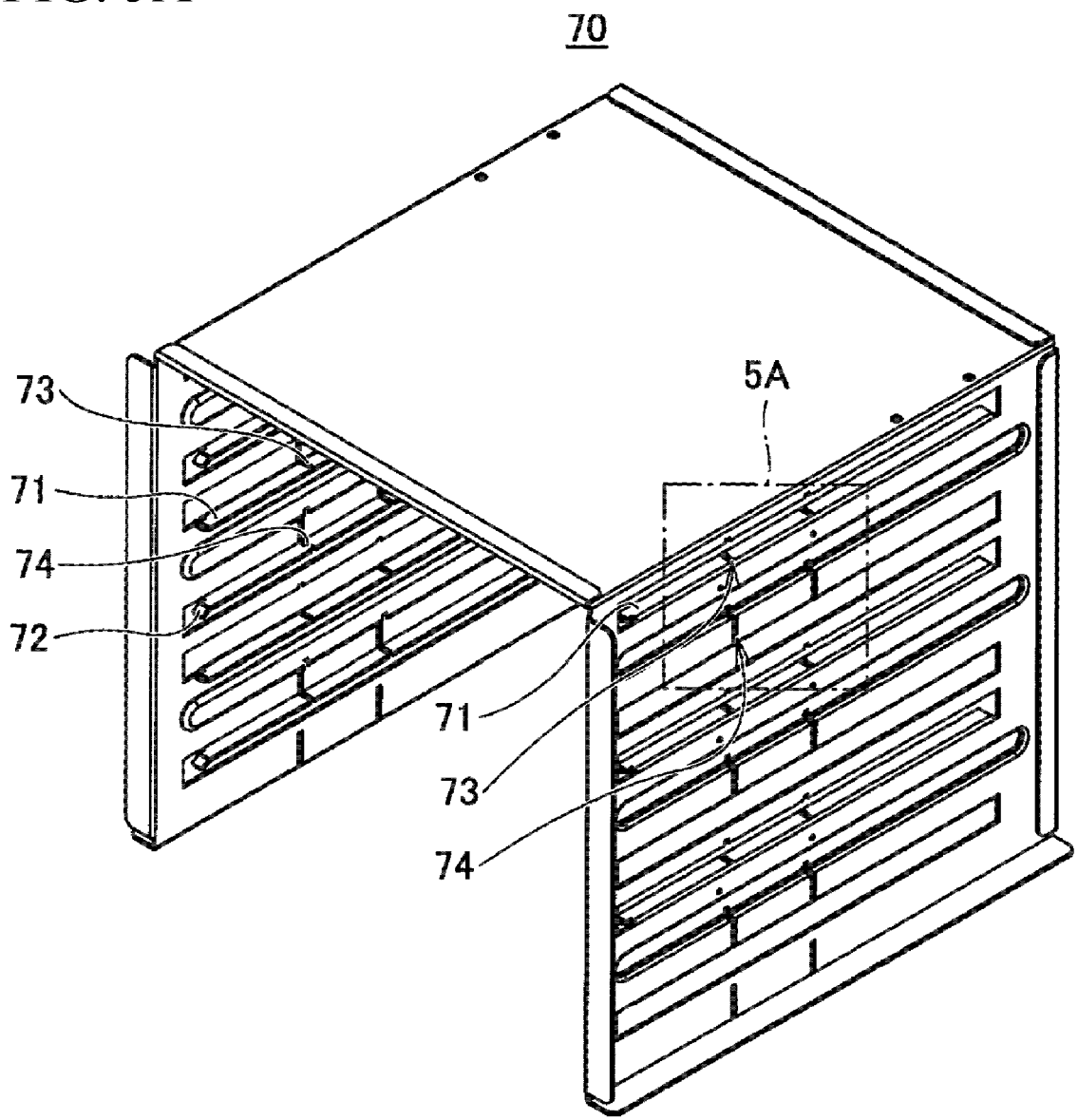
FIG. 5A is a diagram (1) showing a drive case according to a first embodiment.
Figure 5B:
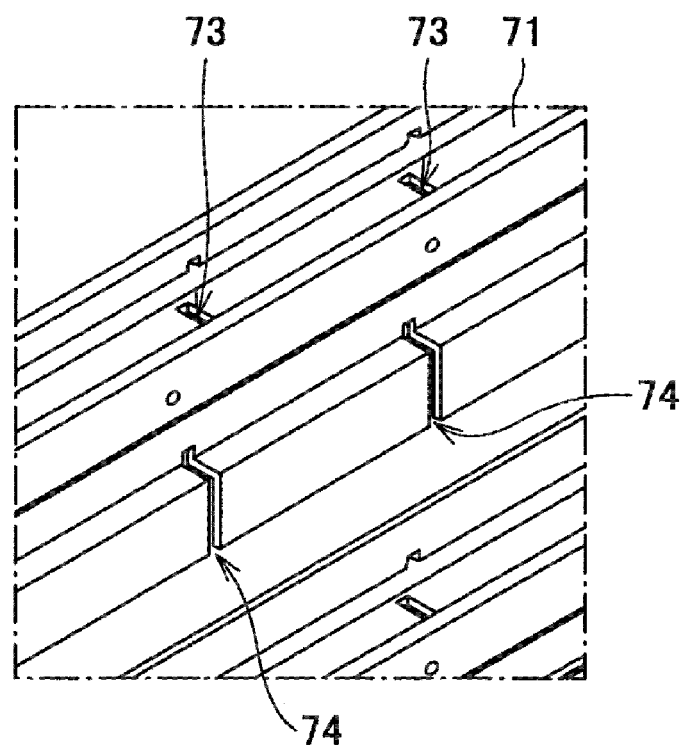
FIG. 5B is a diagram (2) showing the drive case according to the first embodiment.
Figure 6:
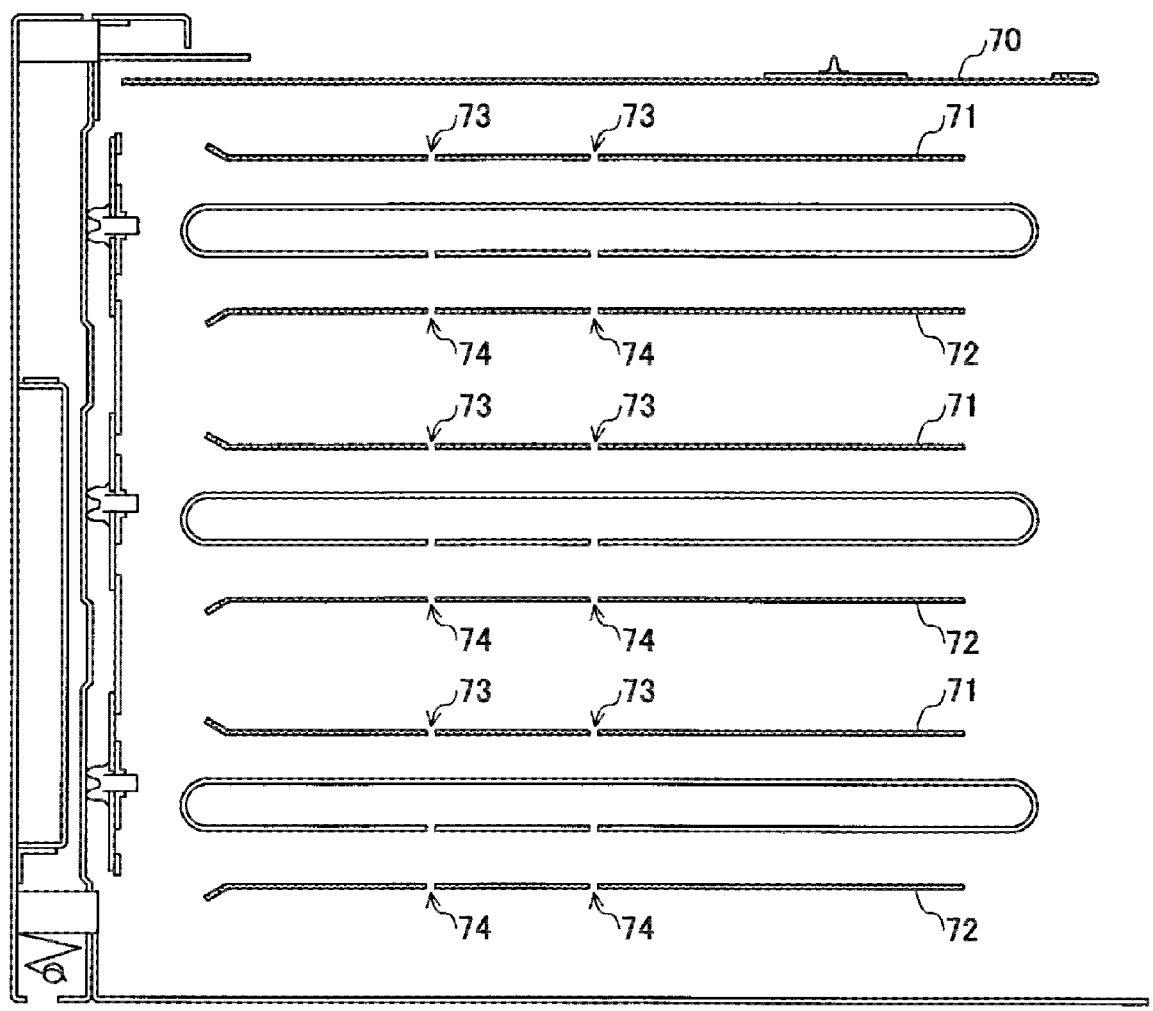
FIG. 6 is a diagram (3) showing the drive case according to the first embodiment.
Figure 7:
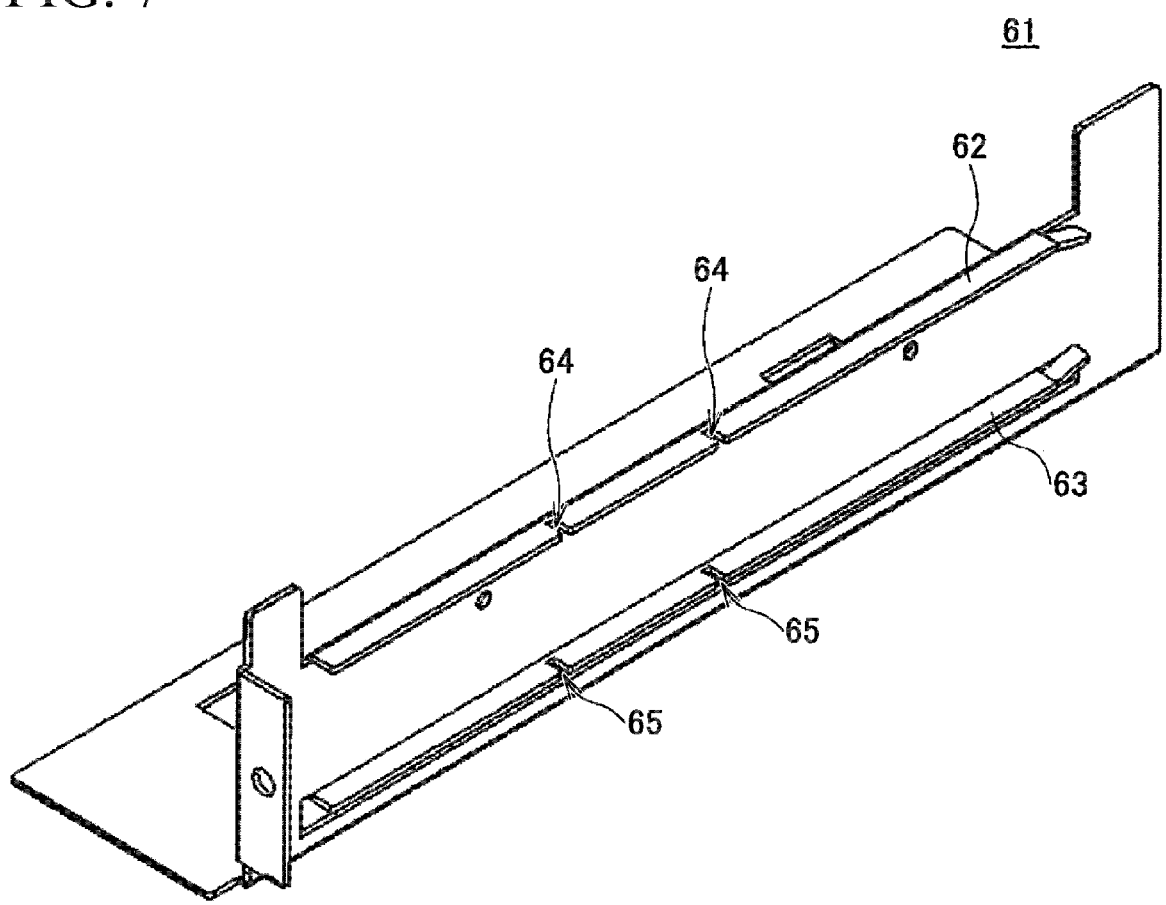
FIG. 7 is a perspective view showing a rail member according to the first embodiment.

A PC which is an information processing device according to this embodiment will be described below. The information processing device according to this embodiment includes a drive case 70 shown in FIGS. 5 and 6, a rail member 61 which is attached to both lateral sides of an HDD unit and which is shown in FIG. 7, and a bar member 80 shown in FIG. 8. FIG. 5A is a perspective view of the drive case 70 and FIG. 5B is an enlarged view of an area which is surrounded by alternating long and short dashed lines 5A in FIG. 5A. FIG. 6 is a sectional view showing an inner part of the side surface of the drive case 70.

As shown in FIGS. 5 and 6, the drive case 70 in this embodiment enables three 5-inch drive units such as an HDD unit or a CD/DVD drive to be attached thereto. In the drive case 70, a first rail guide 71 and a second rail guide 72 which extend from the front side to the deep side are provided in a place to which each drive unit is attached. A first groove 73 is provided at two positions in the first rail guide 71, and a second groove 74 is provided at two positions in the second rail guide 72. The positions at which the first grooves 73 and the second grooves 74 are provided overlap each other in the substantially vertical direction with respect to the direction in which the first rail guide 71 and the second rail guide 72 extend.

A rail member 61 shown in FIG. 7 is attached to both the right and left sides of the HDD unit attached to the information processing device. A first rail 62 and a second rail 63 are provided in the rail member 61. A first groove 64 is provided at two positions in the first rail 62 and a second groove 65 is provided at two positions in the second rail 63. The first grooves 64 of the first rail 62 are provided at the positions corresponding to the first grooves 73 of the first rail guide 71, and the second grooves 65 of the second rail 63 are provided at the positions corresponding to the second grooves 74 of the second rail guide 72.

Figure 8:
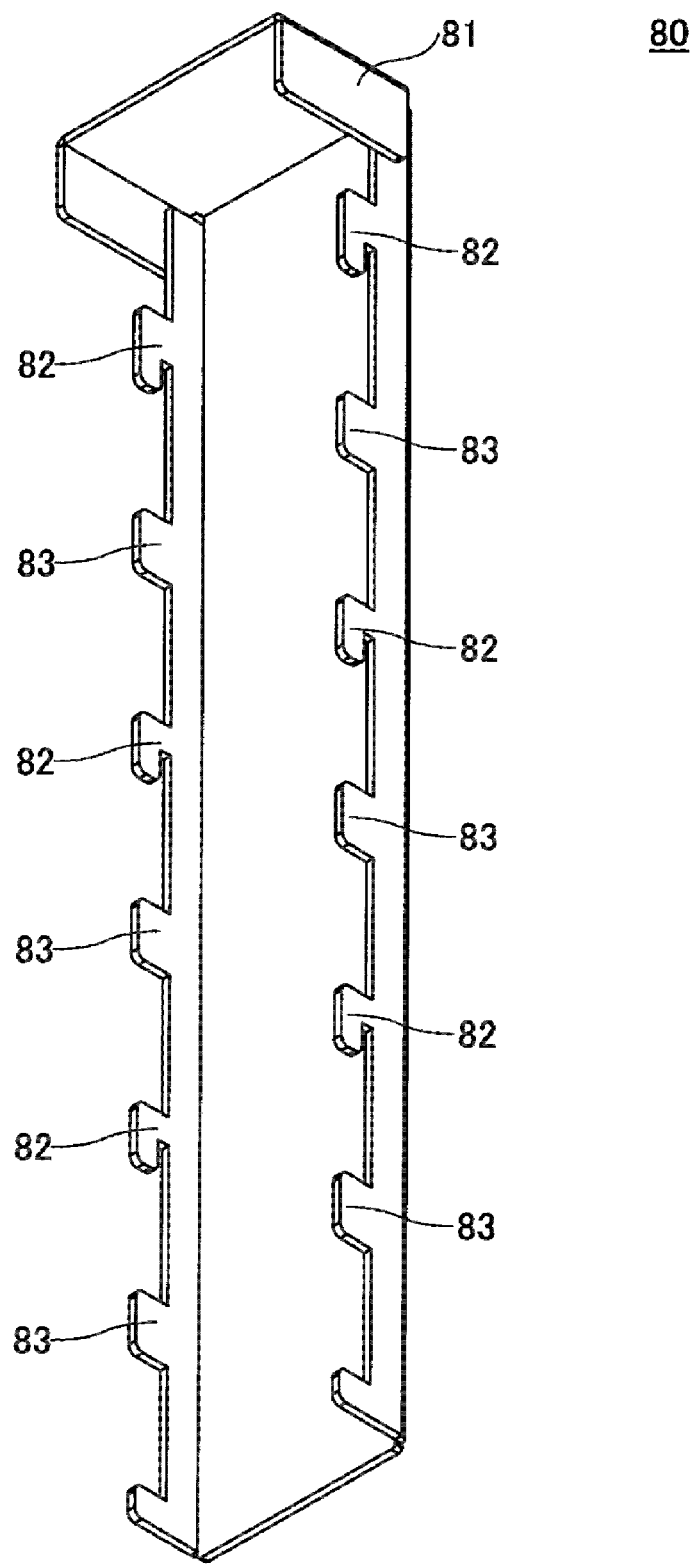
FIG. 8 is a perspective view showing a bar member according to the first embodiment.

As shown in FIG. 8, one end in the length direction of the bar member 80 is bent to form a top portion 81. A first locking portion 82 and a second locking portion 83 are alternately provided in the length direction on both side surfaces of the bar member 80, that is, at both ends in the width direction of the bar member 80. That is, the first locking portion 82 and the second locking portion 83 are provided to correspond to three drive units attached to the drive case 70, and three first locking portions and three second locking portion are alternately provided in the length direction at both ends in the width direction of the bar member 80.

Figure 9:
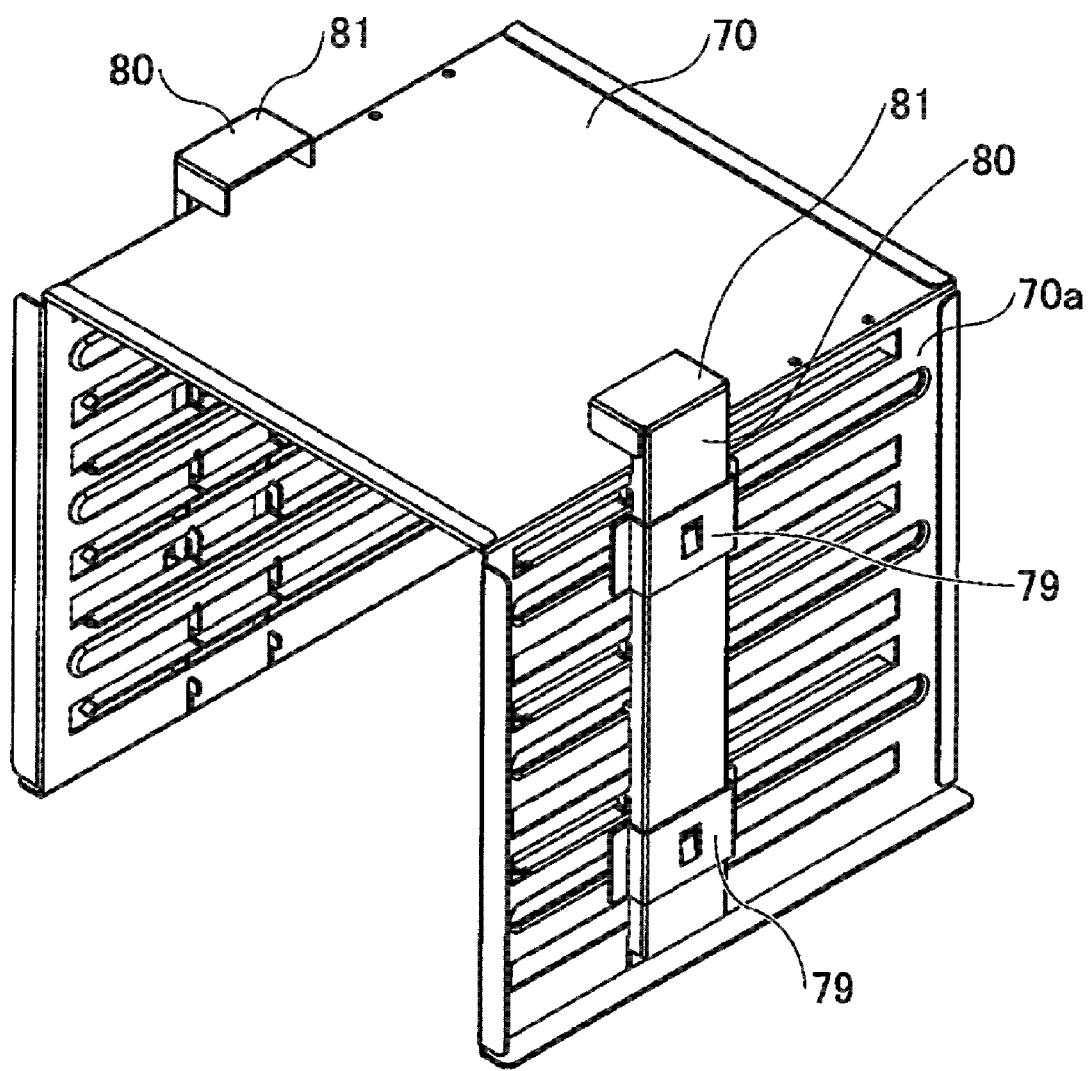
FIG. 9 is a diagram (1) showing an information processing device according to the first embodiment.

FIG. 9 shows a state in which the bar member 80 is attached to the drive case 70 in this embodiment. The bar member 80 is supported by two bar member support portions 79 which are provided on side surfaces 70a of the drive case 70 such that the top portion 81 of the bar member 80 is located on the top side. The bar member 80 is supported in a state in which the bar member 80 is vertically movable, and is provided on both of the side surfaces 70a of the drive case 70.

Figure 10:
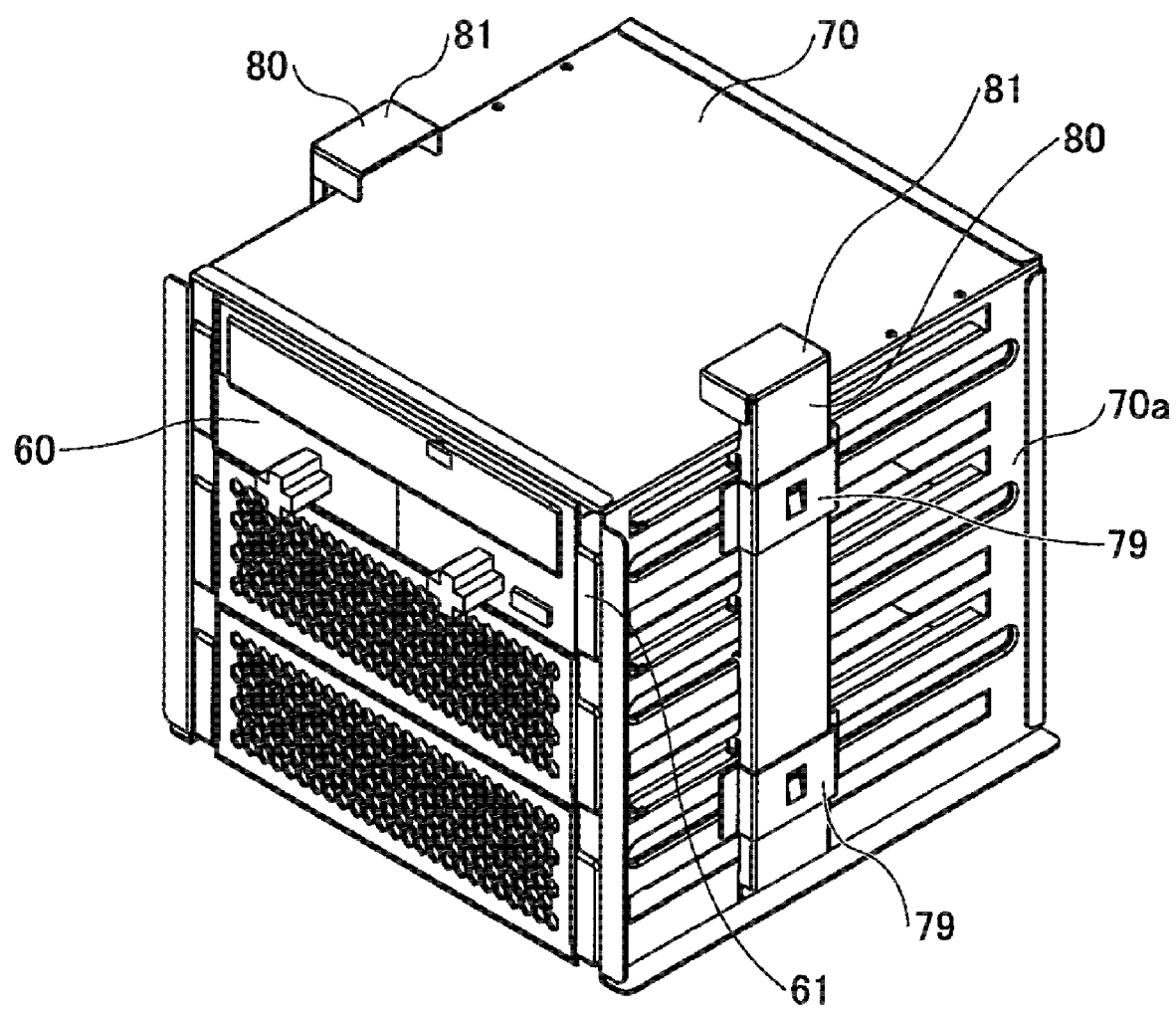
FIG. 10 is a diagram (2) showing the information processing device according to the first embodiment.

In this embodiment, as shown in FIG. 10, the HDD unit 60 having the rail member 61 attached thereto is inserted into a predetermined position of the drive case 70 and is then fixed by the bar members 80. Specifically, by inserting the HDD unit 60 into a predetermined position of the drive case 70 and then moving the bar members 80 downward, the rail member 61 attached to the HDD unit 60 can be fixed to the drive case 70. Accordingly, the HDD unit 60 is attached to the drive case 70. In this specification, a unit attached to the drive case 70 such as the HDD unit 60 may be referred to as a drive unit.

Figure 11:
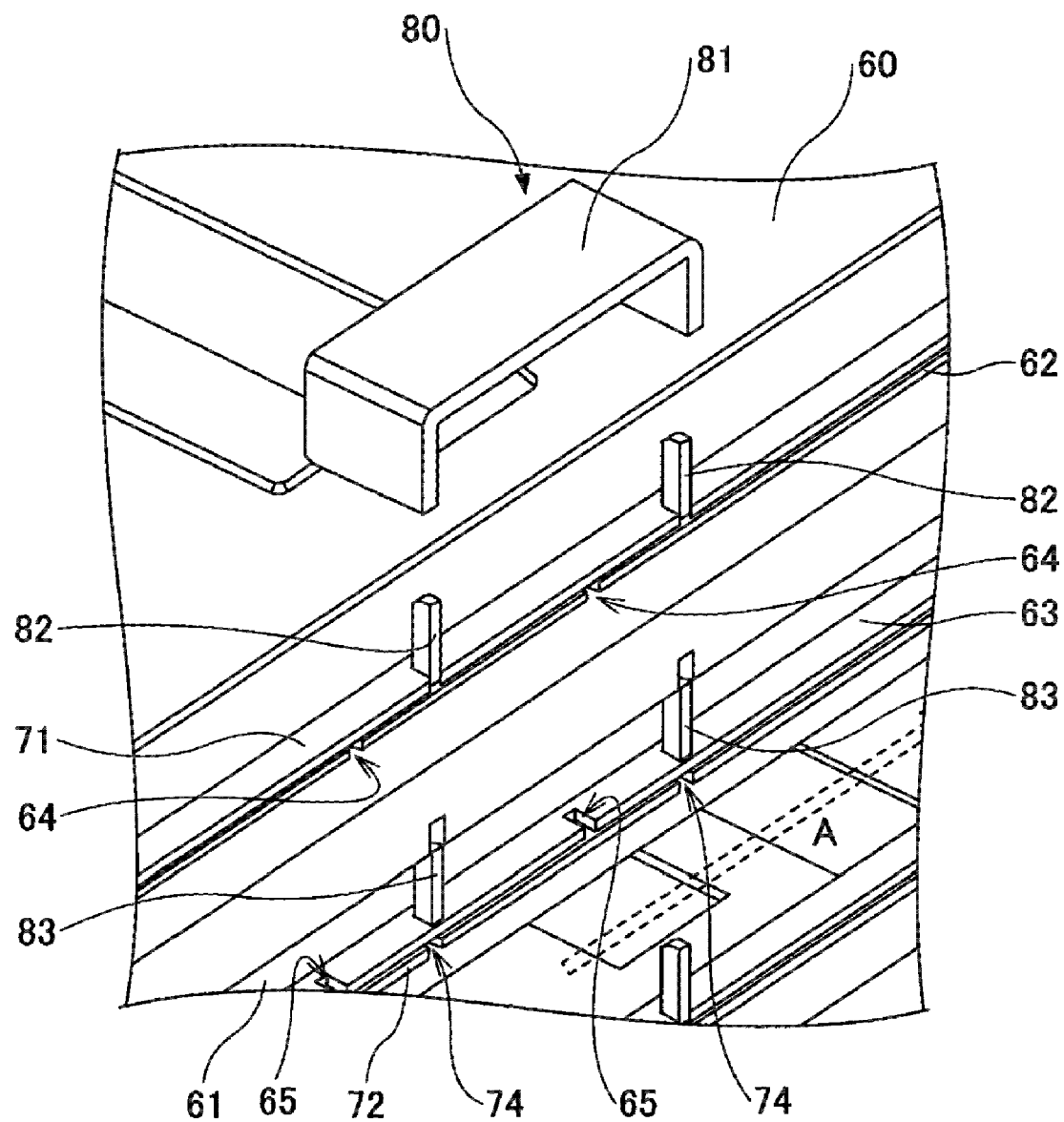
FIG. 11 is a diagram (3) showing the information processing device according to the first embodiment.

More specifically, when the HDD unit 60 having the rail member 61 attached thereto is attached to the drive case 70, the HDD unit 60 having the rail member 61 attached thereto is first inserted into the drive case 70. Specifically, as shown in FIG. 11, the HDD unit 60 having the rail member 61 attached thereto is inserted into the drive case 70 in the direction indicated by a dotted arrow A. FIG. 11 is a perspective view showing principal parts in a state in which the HDD unit 60 having the rail member 61 attached thereto is being inserted into the drive case 70.

Figure 12:
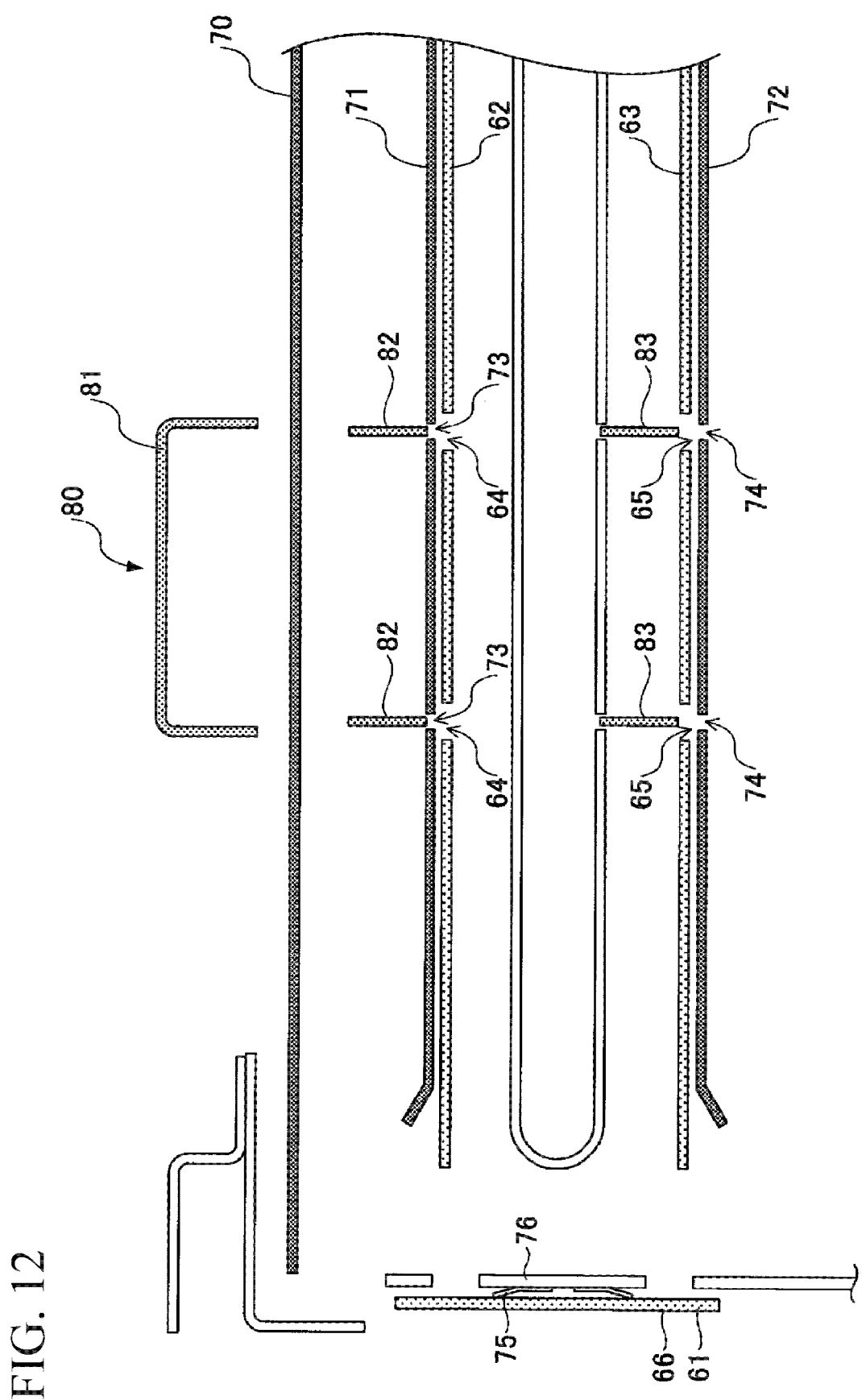
FIG. 12 is a diagram (4) showing the information processing device according to the first embodiment.

FIG. 12 shows sectional surfaces of principal parts in a state in which the HDD unit 60 having the rail member 61 attached thereto is inserted into a predetermined position of the drive case 70. In this state, the position of the first grooves 64 which are provided in the first rail 62 of the rail member 61 and the position of the first grooves 73 which are provided in the first rail guide 71 of the drive case 70 are aligned with each other in the vertical direction in the drawing. Similarly, the position of the second grooves 65 which are provided in the second rail 63 of the rail member 61 and the position of the second grooves 74 which are provided in the second rail guide 72 of the drive case 70 are aligned with each other in the vertical direction in the drawing.

Figure 13:
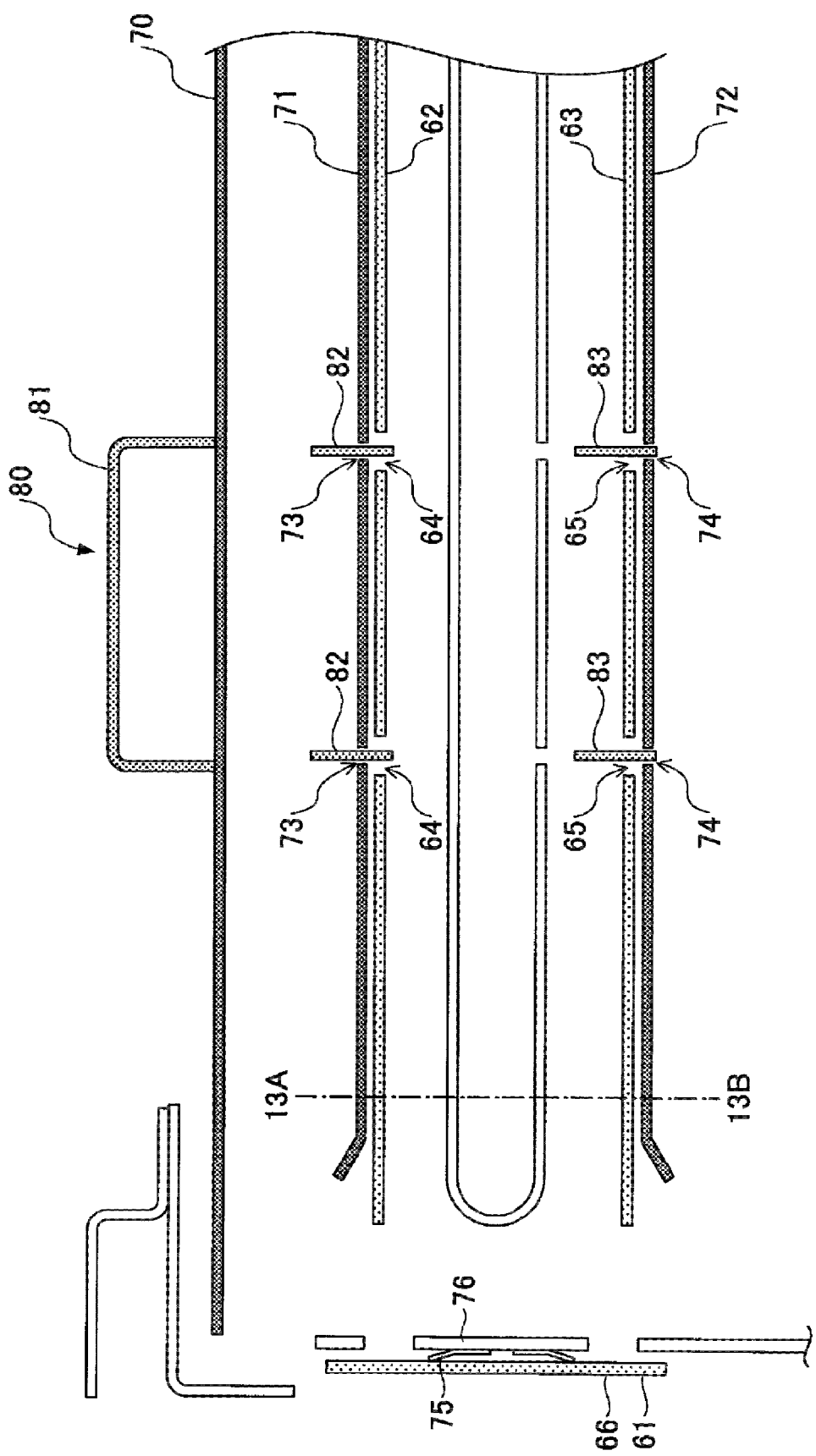
FIG. 13 is a diagram (5) showing the information processing device according to the first embodiment.
Figure 14:
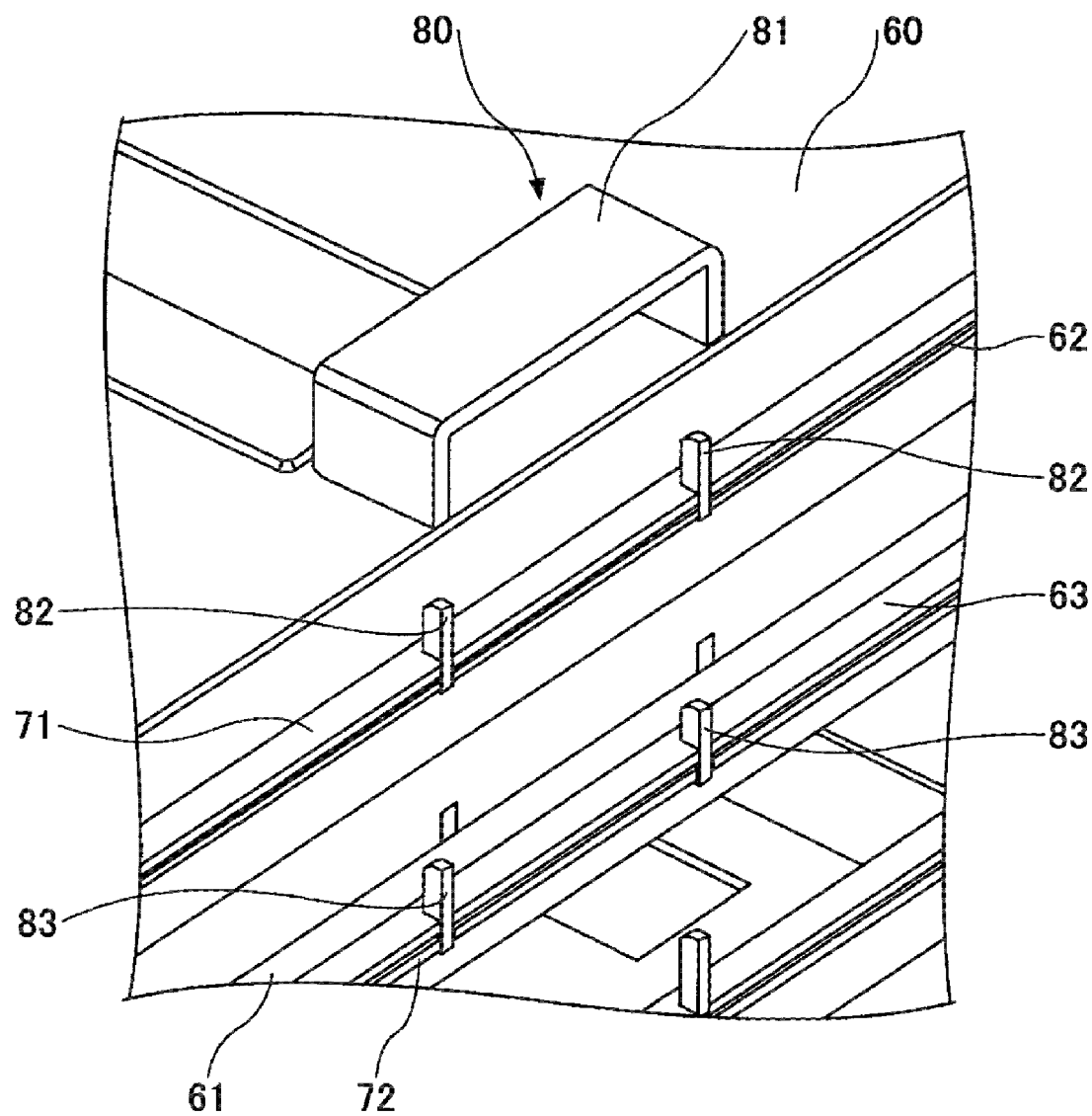
FIG. 14 is a diagram (6) showing the information processing device according to the first embodiment.

In this state, the bar member 80 is moved downward in the drawing. Accordingly, as shown in FIG. 13, the first locking portions 82 of the bar member 80 are inserted into the first grooves 64 which are provided in the first rail 62 of the rail member 61 and the first grooves 73 which are provided in the first rail guide 71 of the drive case 70. Similarly, the second locking portions 83 of the bar member 80 are inserted into the second grooves 65 which are provided in the second rail 63 of the rail member 61 and the second grooves 74 which are provided in the second rail guide 72 of the drive case 70. Accordingly, the rail member 61 attached to the HDD unit 60 is fixed to the drive case 70 by the first locking portions 82 and the second locking portions 83 of the bar member 80. FIG. 14 is a perspective view showing principal parts in this state.

Figure 15:
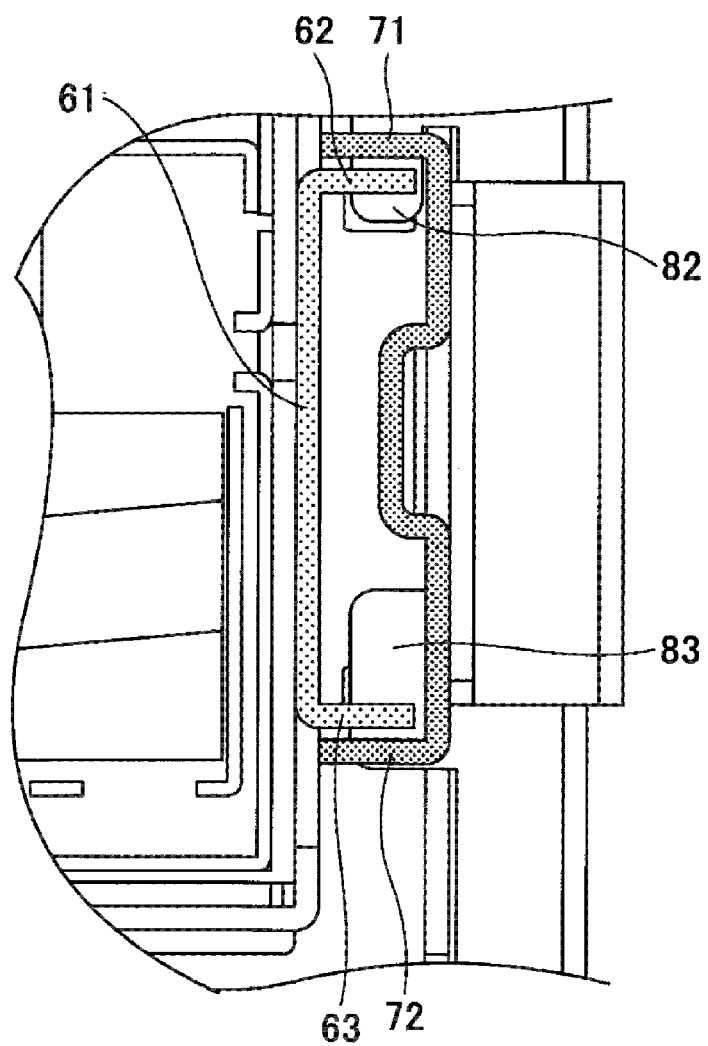
FIG. 15 is a diagram (7) showing the information processing device according to the first embodiment.

FIG. 15 is a sectional view taken along alternating long and short dashed lines 13A-13B in FIG. 13. As shown in FIG. 15, the first rail 62 and the second rail 63 of the rail member 61 which is attached to the HDD unit 60 are inserted in a state in which the rails are interposed between the first rail guide 71 and the second rail guide 72 of the drive case 70.

In the information processing device according to this embodiment, when the HDD unit 60 is attached or detached, no screw needs to be fastened or removed and the bar member 80 has only to be moved vertically. Accordingly, it is possible to reduce the number of work process required for exchange or additional installation of an HDD unit and to perform exchange or additional installation of an HDD unit in a short amount of time. Since no screw is used to fix an HDD unit, it is possible to prevent loss of a screw or forgetting of fastening of a screw.

In this embodiment, the widths of the first grooves 64 and the second grooves 65 of the rail member 61 and the first grooves 73 and the second grooves 74 of the drive case 70 are set to be larger than the thicknesses of the first locking portions 82 and the second locking portions 83 of the bar member 80. This is because a manufacturing error or the like is considered to smoothly insert the first locking portions 82 and the second locking portions 83 of the bar member 80 into the first grooves 64 of the rail member 61 and the second grooves 65 of the rail member 61. Accordingly, a gap may be formed between the first groove 64 of the rail member 61 and the first locking portion 82 of the bar member 80 and between the second groove 65 of the rail member 61 and the second locking portion 83 of the bar member 80. When this gap is formed, the rail member 61 is loosened from the drive case 70, its position is unstable, and thus the HDD unit 60 having the rail member 61 attached thereto may rattle.

Figure 16:
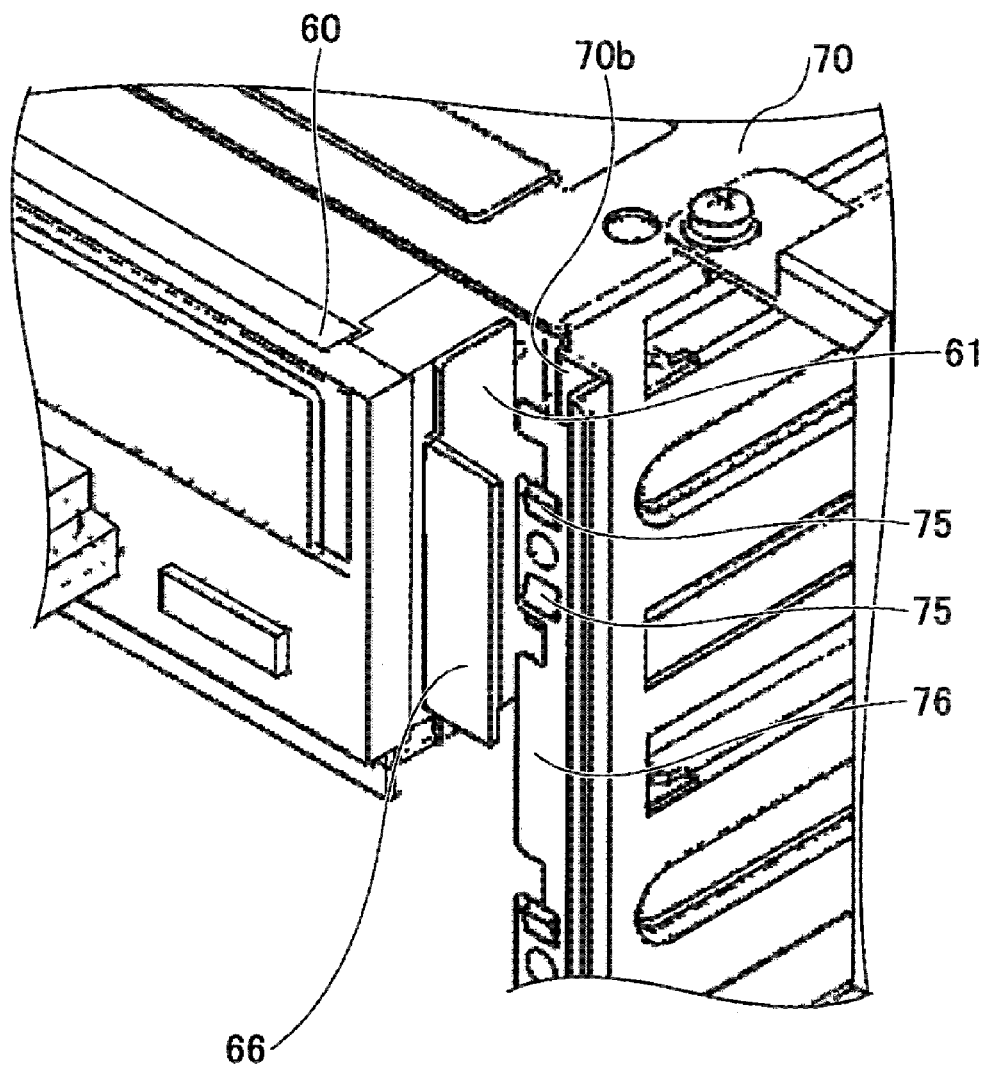
FIG. 16 is a diagram (8) showing the information processing device according to the first embodiment.

Accordingly, in this embodiment, a spring member 76 including a spring portion 75 is attached to a front surface 70b of the drive case 70 as shown in FIG. 16. The spring portion 75 is formed of a leaf spring or the like. As shown in FIG. 13 or the like, in the state in which the HDD unit 60 having the rail member 61 attached thereto is inserted into a predetermined position of the drive case 70, a front portion 66 which is provided on an entrance side of the rail member 61 is pressed outward by the spring portion 75. That is, in the state in which the HDD unit 60 having the rail member 61 attached thereto is inserted into the predetermined position of the drive case 70, a restoring force for pressing the front portion 66 of the rail member 61 outward acts on the spring portion 75.

Accordingly, the rail member 61 is further pressed leftward in the state shown in FIG. 13 by the restoring force of the spring portion 75, the right side of the first groove 64 of the rail member 61 and the right side of the first locking portion 82 of the bar member 80 come into contact with each other, and the first locking portion 82 is further pressed leftward. Similarly, the right side of the second groove 65 of the rail member 61 and the right side of the second locking portion 83 of the bar member 80 come into contact with each other by the restoring force of the spring portion 75 and the second locking portion 83 is further pressed leftward. Accordingly, it is possible to prevent rattling or the like. A case in which the spring member 76 including the spring portion 75 is provided has been described above, but the spring portion may be formed by processing a part of the front surface 70*b* of the drive case 70.

Figure 17:
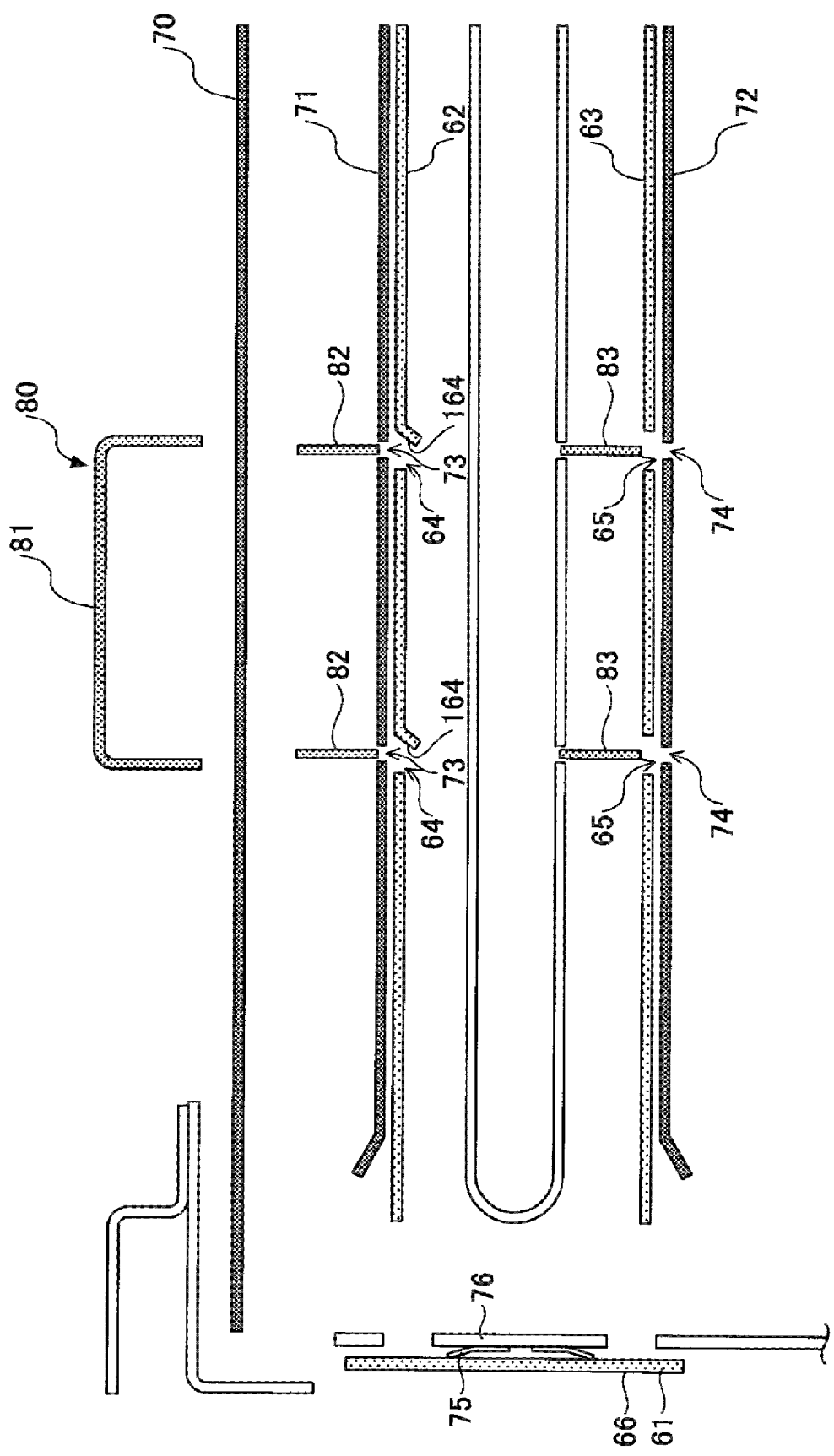
FIG. 17 is a diagram (9) showing the information processing device according to the first embodiment.

In this embodiment, the restoring force in a direction in which the HDD unit 60 having the rail member 61 attached thereto is moved outward is applied by the spring portion 75. Accordingly, there is a likelihood that insertion will not be easily performed when the first locking portion 82 and the like of the bar member 80 are inserted into the first grooves 64 and the like of the first rail 62 of the rail member 61. Accordingly, as shown in FIG. 17, the right side of the first groove 64 of the first rail 62 of the rail member 61 (the right side of a surrounding edge of the first groove 64) may be slightly bent downward, that is, in a direction in which the first locking portion 82 of the bar member 80 is inserted, to form an inclined portion 164. By providing the inclined portion 164 in the first groove 64 in this way, the right side of the bottom end of the first locking portion 82 of the bar member 80 comes into contact with the inclined portion 164 of the first groove 64 of the first rail 62 and presses the rail member 61 rightward, when the bar member 80 is moved downward. Accordingly, the first locking portion 82 of the bar member 80 can be smoothly inserted into the first groove 64 of the first rail 62 of the rail member 61.

(Information Processing Device)

Figure 18:
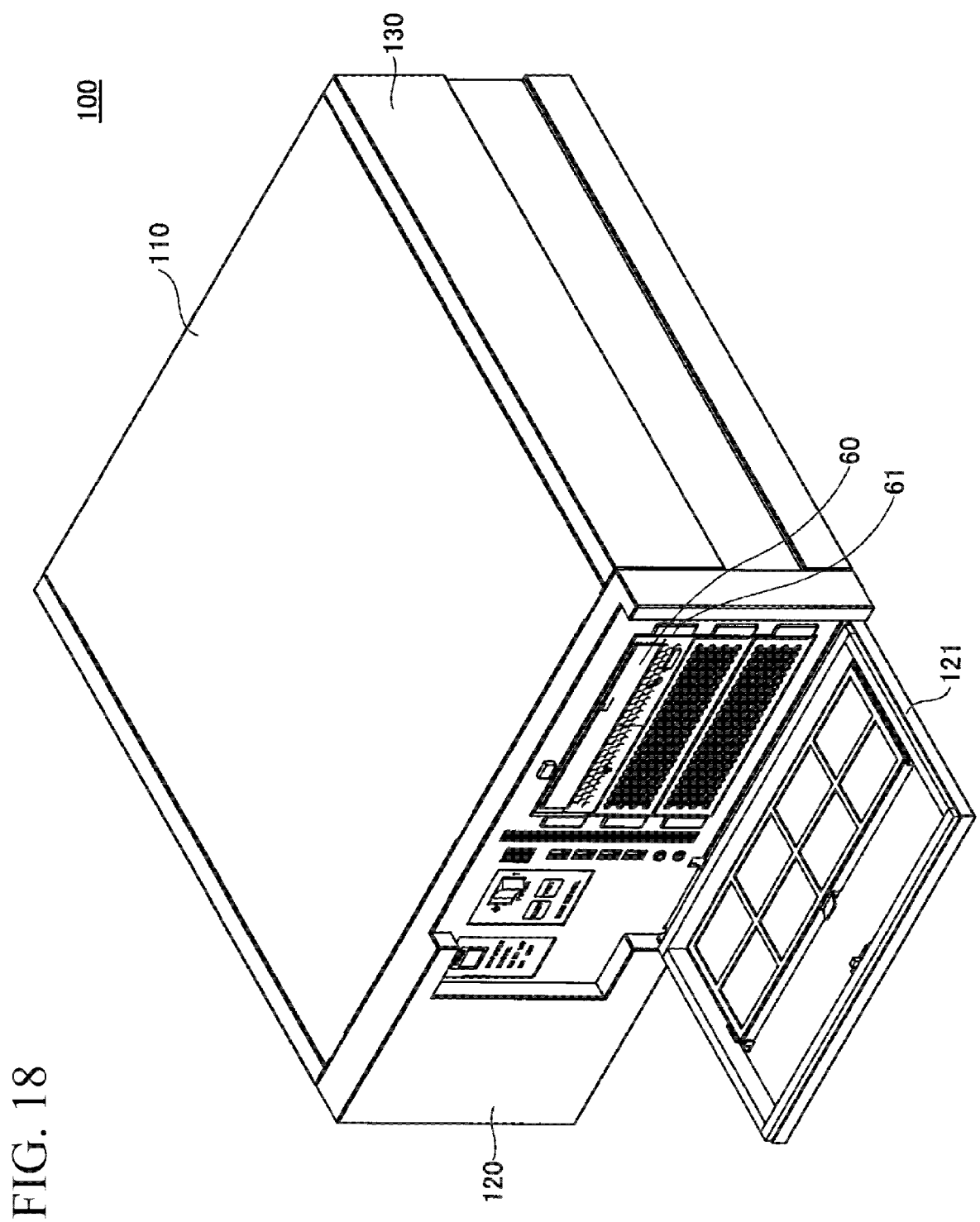
FIG. 18 is a perspective view (1) showing an appearance of the information processing device according to the first embodiment.
Figure 19:
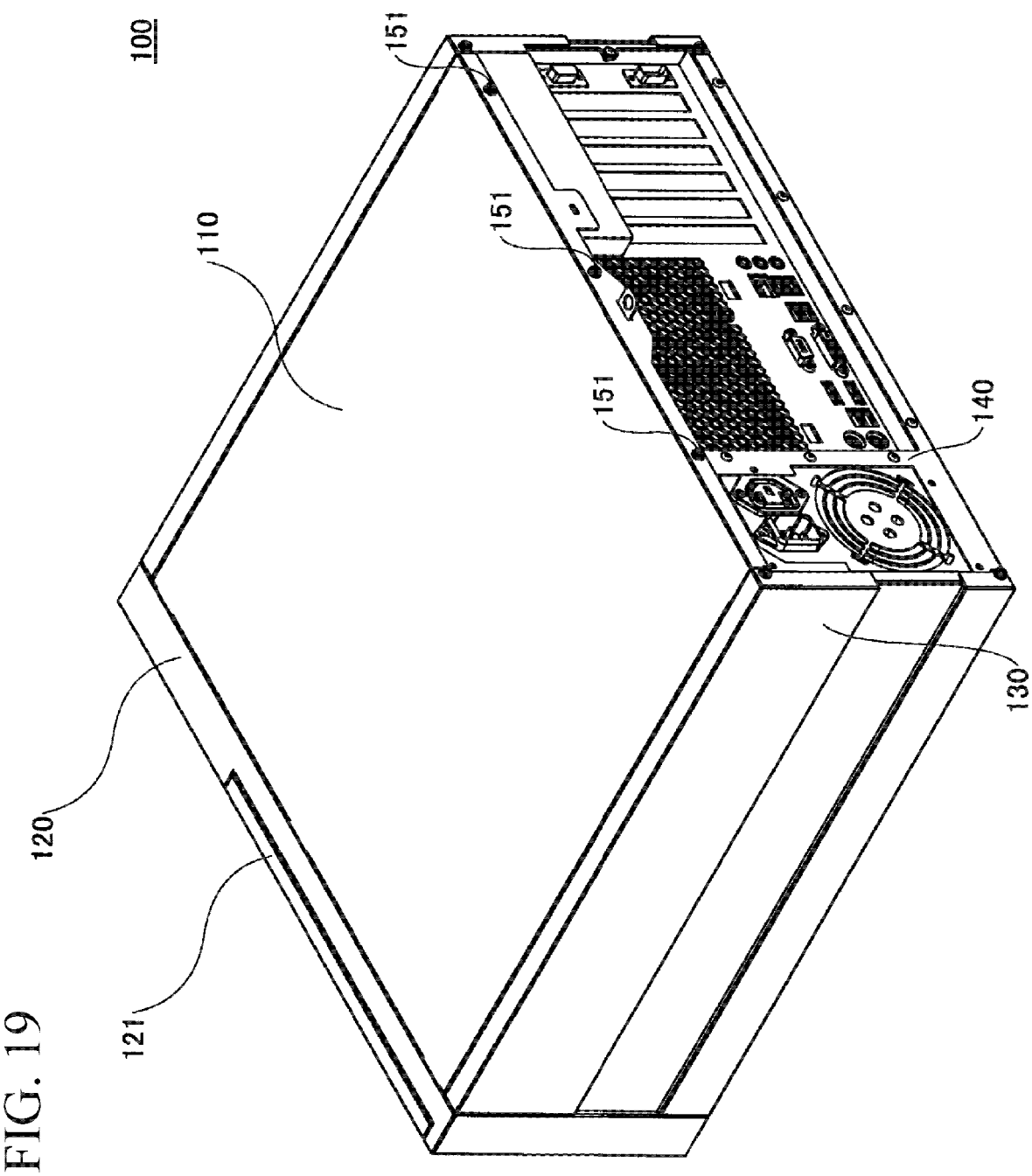
FIG. 19 is a perspective view (2) showing an appearance of the information processing device according to the first embodiment.

A case in which the HDD unit 60 attached to the information processing device according to this embodiment is detached will be described below. The information processing device according to this embodiment is a PC 100, and is covered with a housing such as a top cover 110, a front cover 120 in which a lid 121 is provided, a side cover 130, and a rear cover 140 as shown in FIGS. 18 and 19. FIG. 18 is a perspective view of the PC 100 according to this embodiment when seen from the front side, and FIG. 19 is a perspective view thereof when seen from the rear side. FIG. 18 shows a state in which the lid 121 of the front cover 120 is open.

Figure 20:
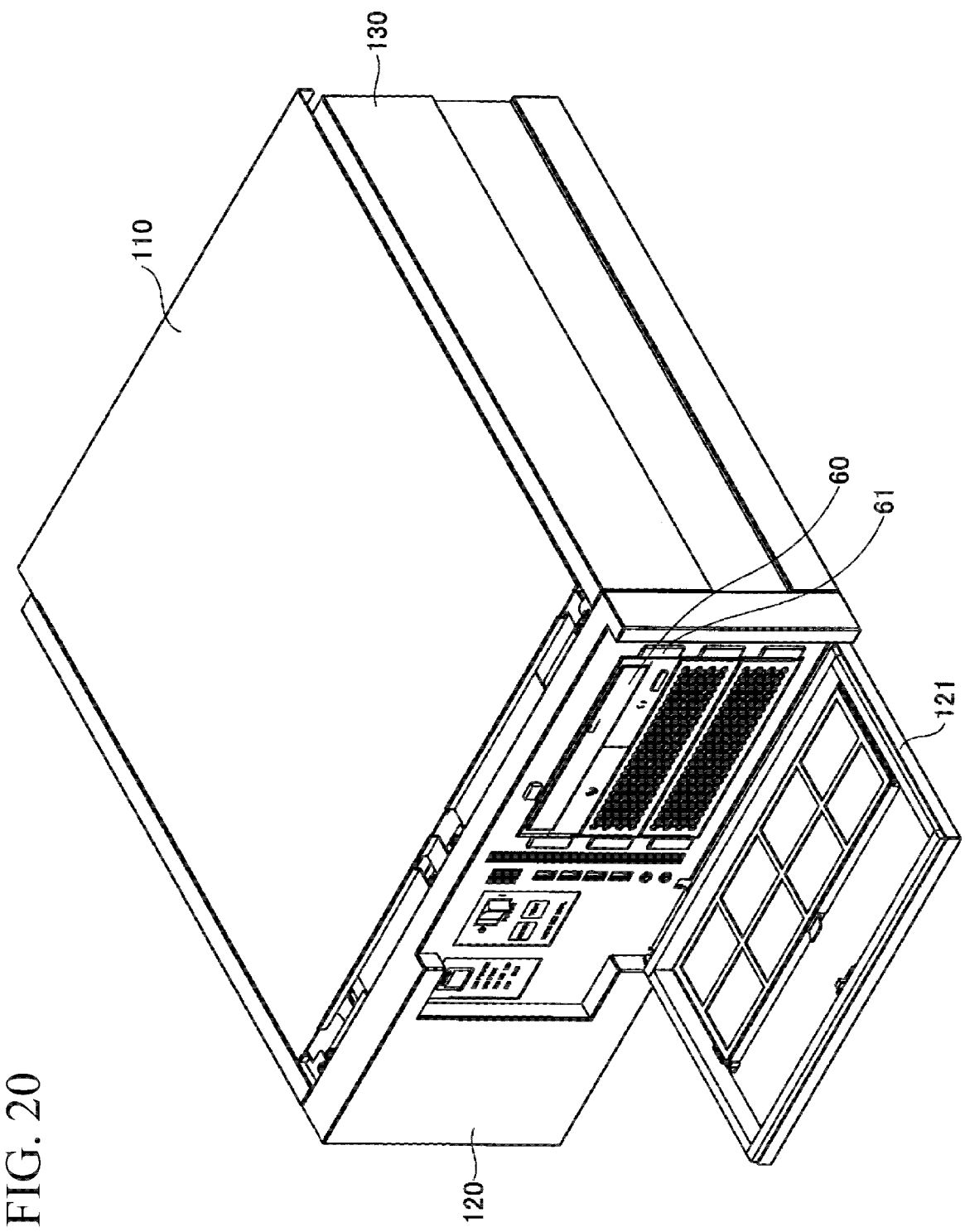
FIG. 20 is a diagram (1) showing a process of detaching an HDD unit in the information processing device according to the first embodiment.
Figure 21:
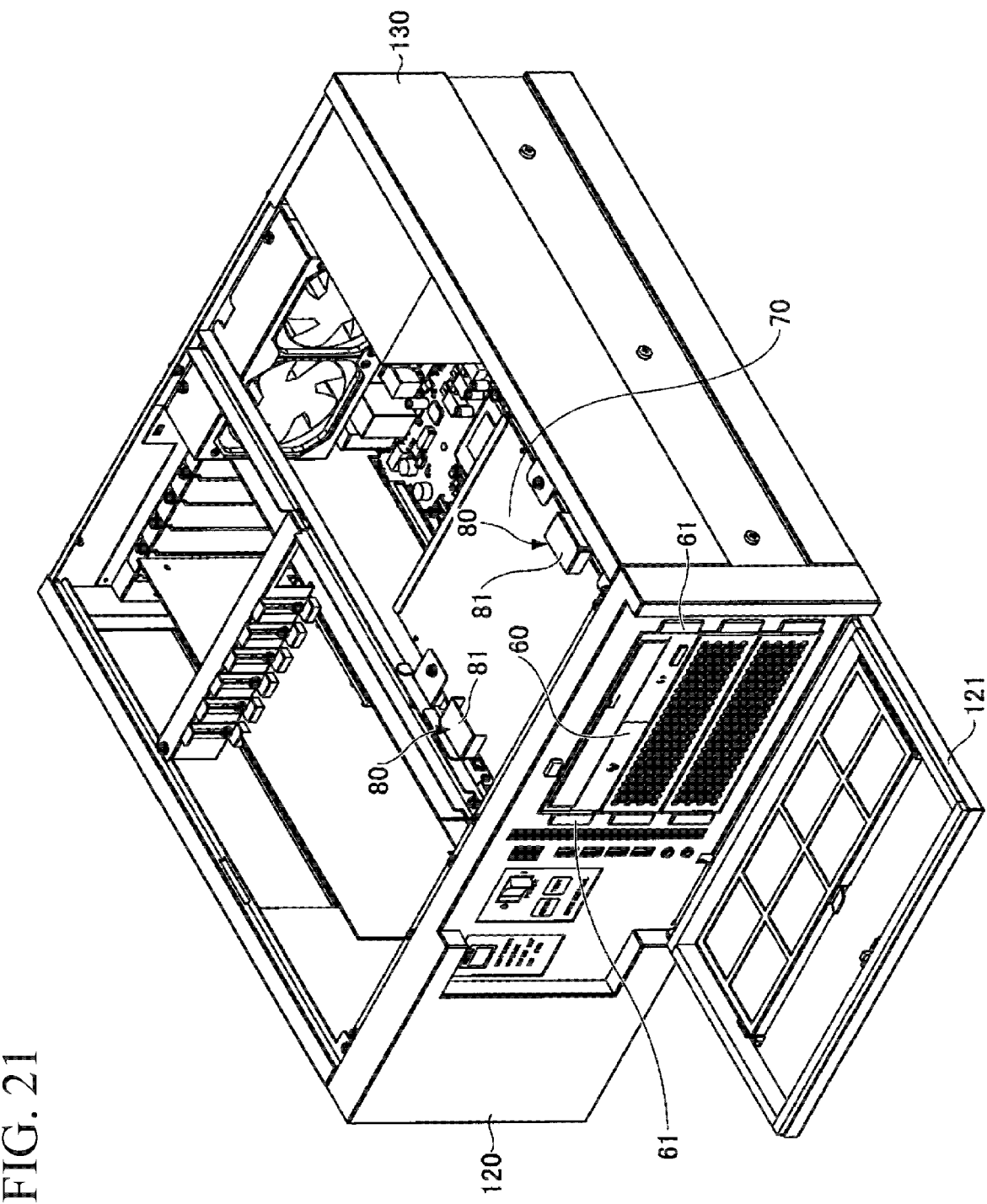
FIG. 21 is a diagram (2) showing a process of detaching an HDD unit in the information processing device according to the first embodiment.
Figure 22:
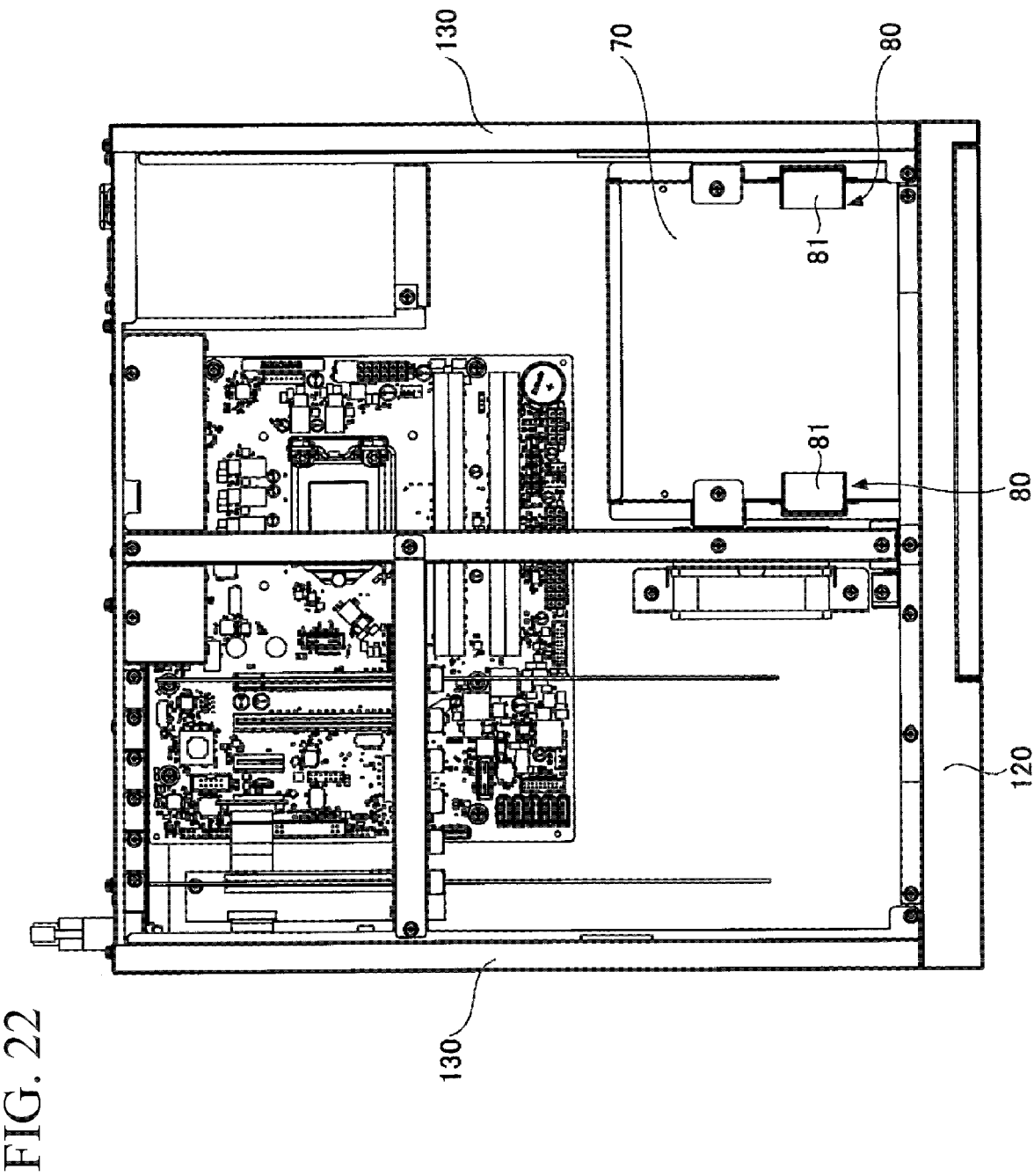
FIG. 22 is a diagram (3) showing a process of detaching an HDD unit in the information processing device according to the first embodiment.

When the HDD unit 60 attached to the PC 100 according to this embodiment is intended to be detached, the top cover 110 is first detached. Specifically, the top cover 110 is screwed to the rear cover 140 by three screws 151, and the top cover 110 can be detached by removing the three screws 151 and sliding the top cover 110 rearward as shown in FIG. 20. FIG. 21 is a perspective view showing a state in which the top cover 110 is detached and FIG. 22 is a top view thereof.

Figure 23:
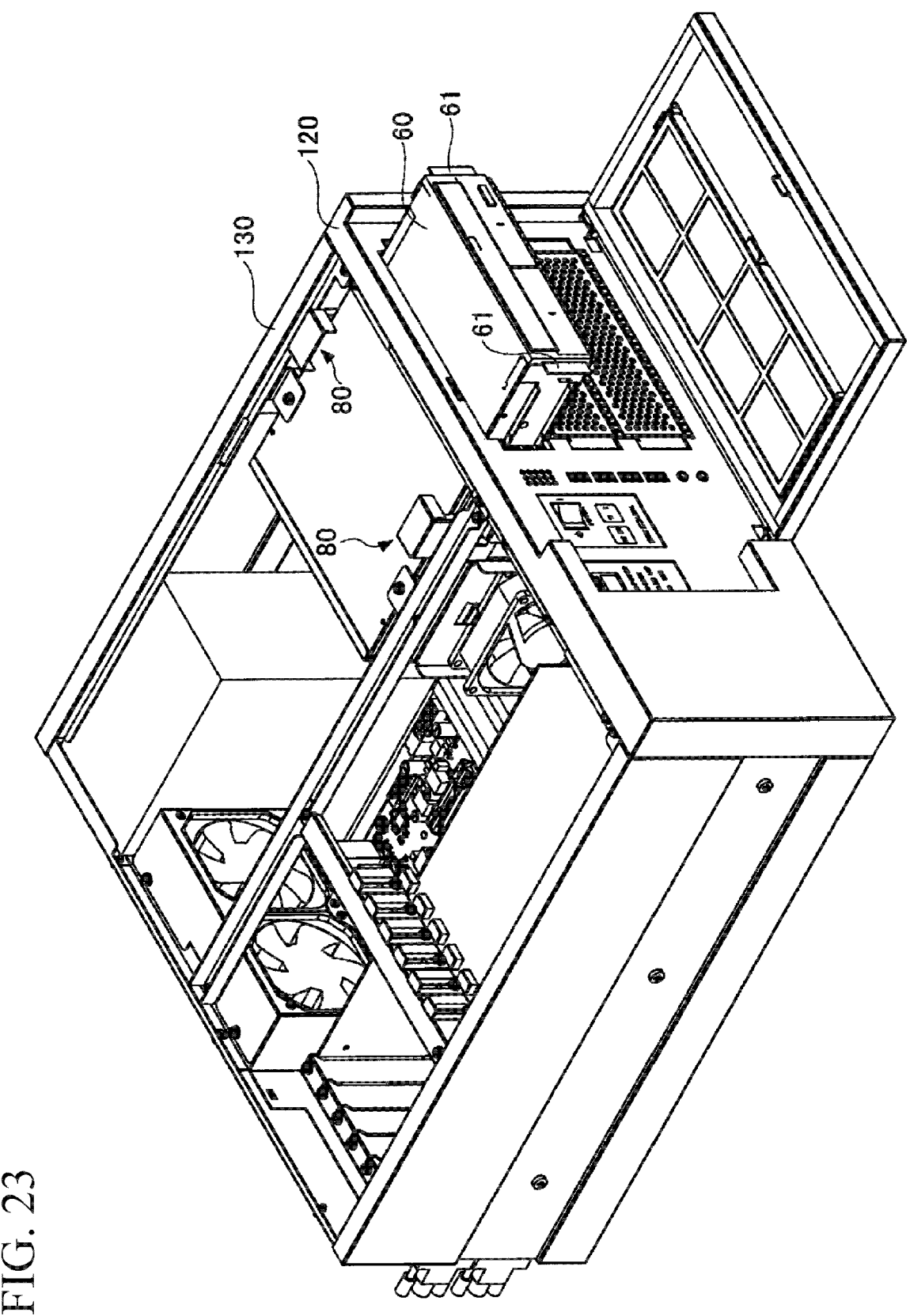
FIG. 23 is a diagram (4) showing a process of detaching an HDD unit in the information processing device according to the first embodiment.

Thereafter, the top portion 81 of the bar member 80 is moved upward. Accordingly, as shown in FIG. 12, the first locking portion 82 of the bar member 80 is moved outward from the first groove 64 of the first rail 62 of the rail member 61 and the first groove 73 of the first rail guide 71 of the drive case 70. Similarly, the second locking portion 83 of the bar member 80 is moved outward from the second groove 65 of the second rail 63 of the rail member 61 and the second groove 74 of the second rail guide 72 of the drive case 70. Accordingly, the rail member 61 can move forward, and the HDD unit 60 having the rail member 61 attached thereto can be moved forward and detached as shown in FIG. 23. That is, in this embodiment, exchange of the HDD unit or the like can be performed by detaching the top cover 110 and opening the lid 121 attached to the front cover 120 without detaching the front cover 120.

Thereafter, when the HDD unit is exchanged, another HDD unit having a rail member 61 attached thereto is inserted into a predetermined position of a 5-inch bay of the drive case 70 and the bar member 80 is moved downward. Accordingly, the rail member 61 attached to the new HDD unit is supported in the drive case 70 by the bar member 80 and is fixed not to be moved forward.

Accordingly, in this embodiment, since the rail member 61 attached to the HDD unit 60 can be attached without using a screw, it is possible to exchange and additionally install an HDD unit without detaching the front cover 120. Accordingly, it is possible to reduce the number of work process required for exchange or additional installation of an HDD unit and to perform exchange or additional installation of an HDD unit in a short amount of time.

Figure 24A:
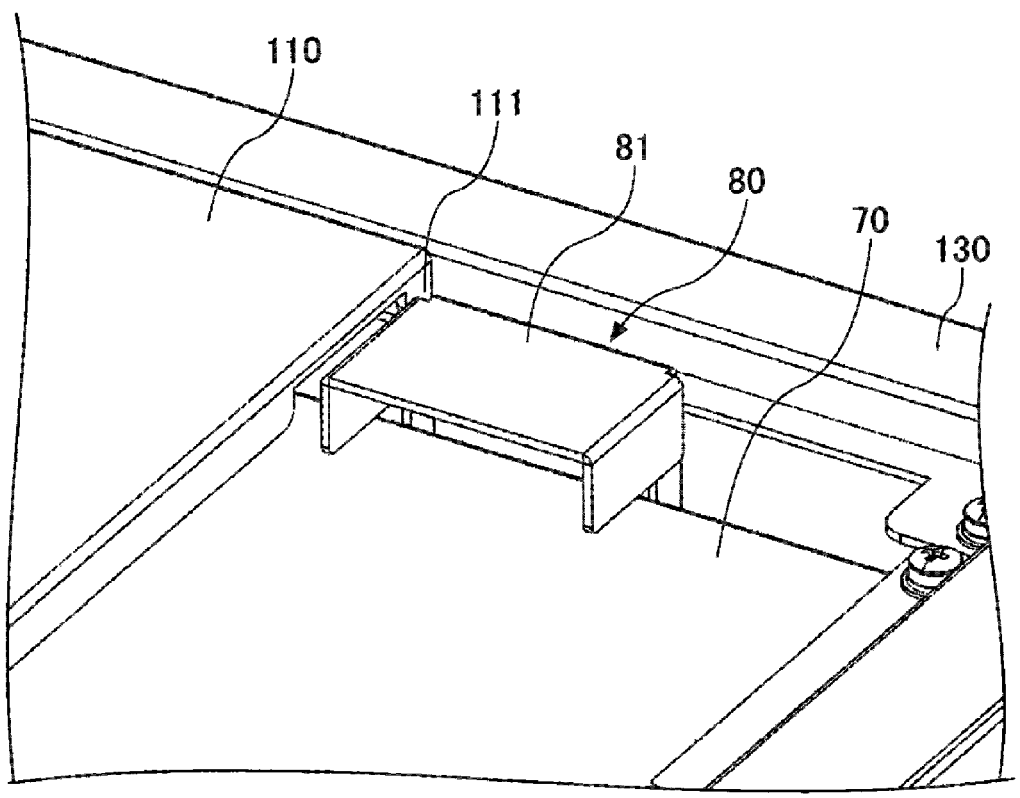
FIG. 24A is a diagram (1) showing a relationship between a bar member and a top cover in the first embodiment.
Figure 24B:
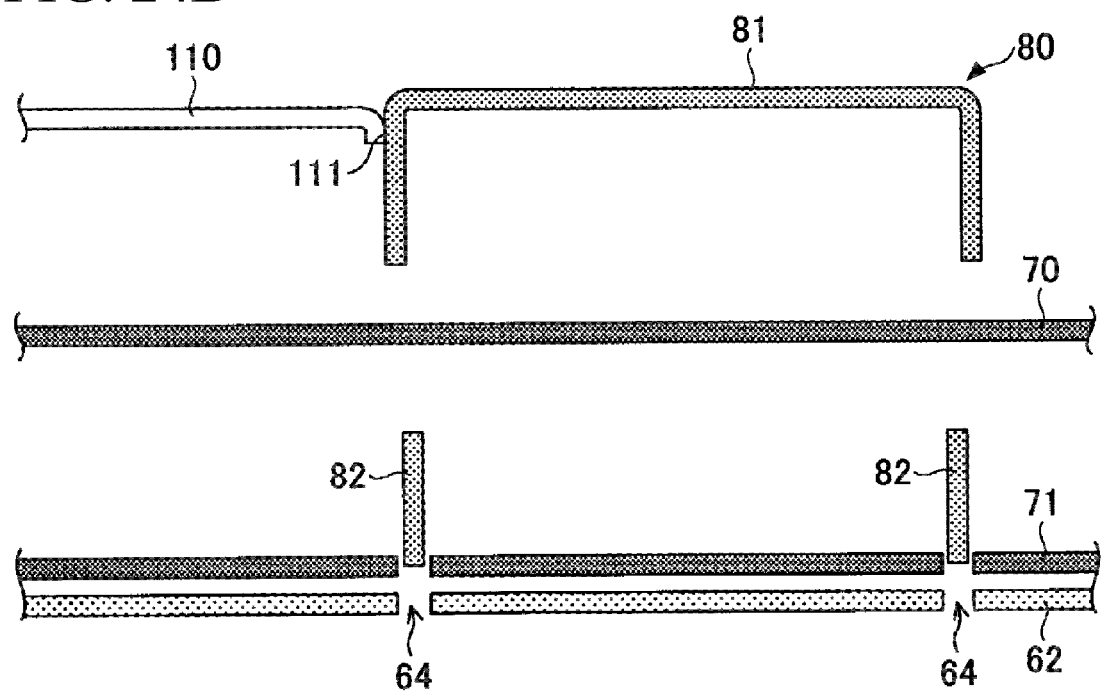
FIG. 24B is a diagram (2) showing a relationship between the bar member and the top cover in the first embodiment.
Figure 25A:
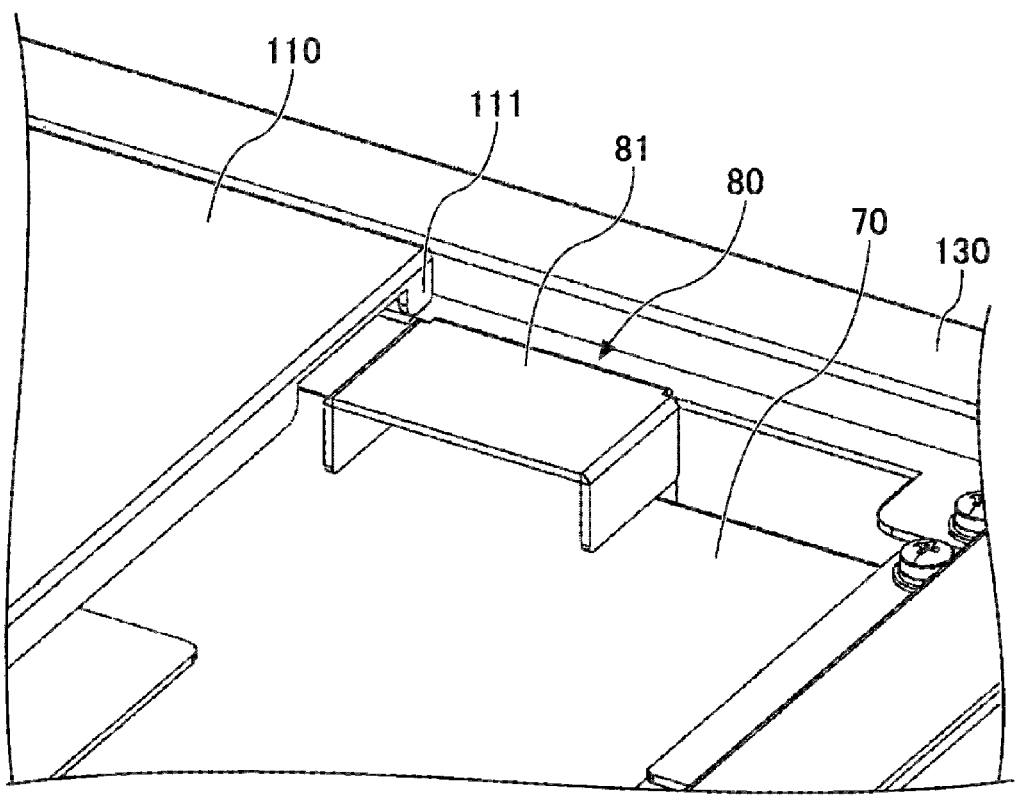
FIG. 25A is a diagram (3) showing a relationship between the bar member and the top cover in the first embodiment.
Figure 25B:
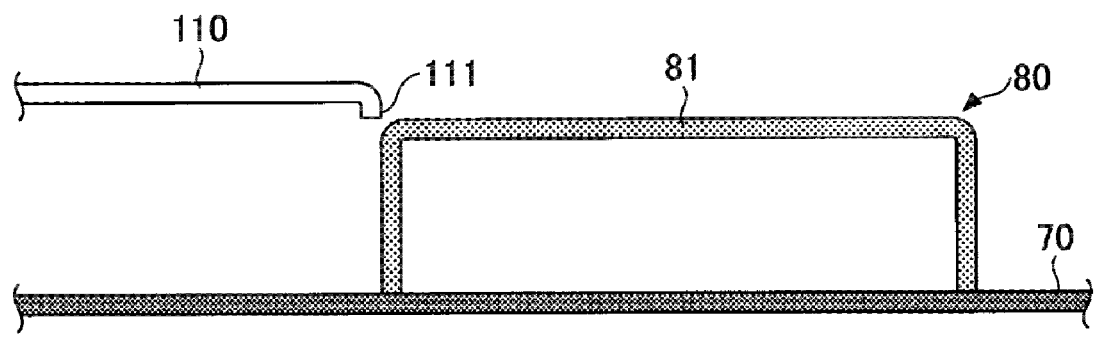
FIG. 25B is a diagram (4) showing a relationship between the bar member and the top cover in the first embodiment.
Figure 25B:
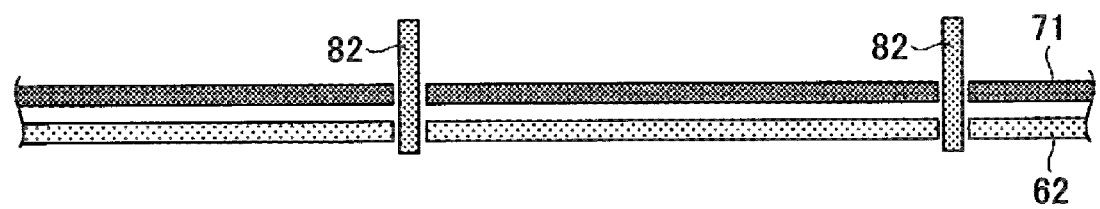

After exchange or additional installation of an HDD unit has been performed, the top cover 110 is closed by sliding. At this time, when downward movement of the bar member 80 has been forgotten as shown in FIG. 24, the bar member 80 is in an upward moved state and thus the top cover 110 comes into contact with the top portion 81 of the bar member 80 even when the top cover 110 is going to be closed by sliding. Accordingly, the top cover 110 cannot be closed. That is, in a state in which the bar member 80 is moved upward, a front end portion 111 of the top cover 110 comes into contact with the top portion 81 of the bar member 80, and thus the top cover 110 is not closed and a user sees that downward movement of the bar member 80 has been forgotten. Accordingly, in this case, the top cover 110 can be closed by sliding without bringing the front end portion 111 of the top cover 110 into contact with the top portion 81 of the bar member 80 by moving the bar member 80 downward as shown in FIG. 25. FIG. 24A is a perspective view showing a state in which the bar member 80 is moved upward and FIG. 24B is a sectional view thereof. FIG. 25A is a perspective view showing a state in which the bar member 80 is moved downward and FIG. 25B is a sectional view thereof.

Figure 26A:
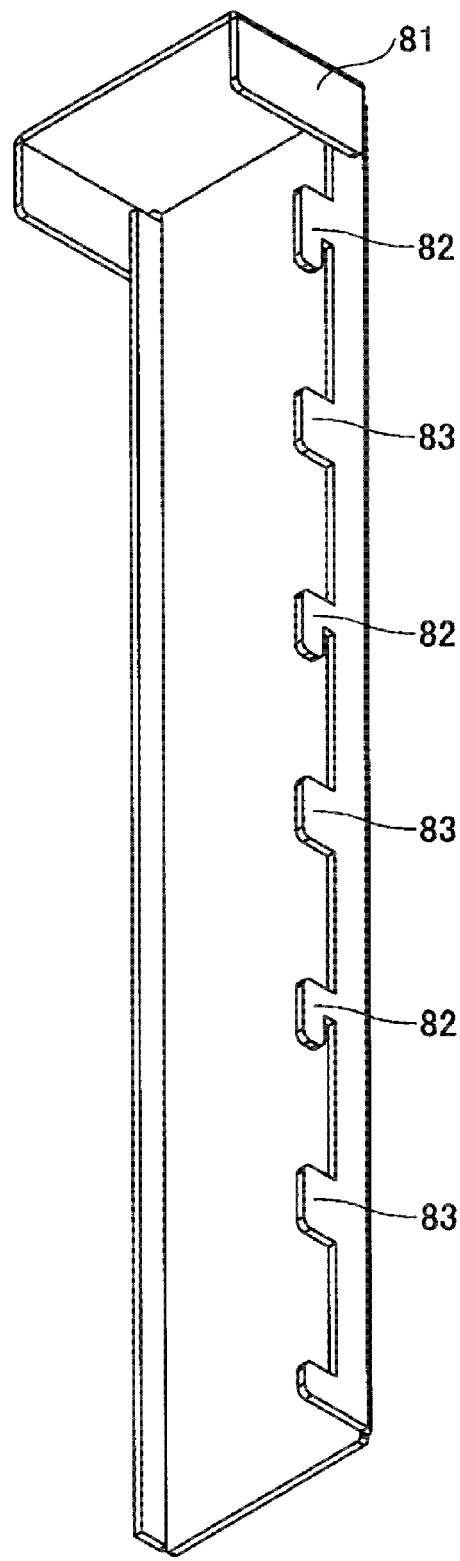
FIG. 26A is a perspective view (1) showing a modified example of the bar member according to the first embodiment.
Figure 26B:
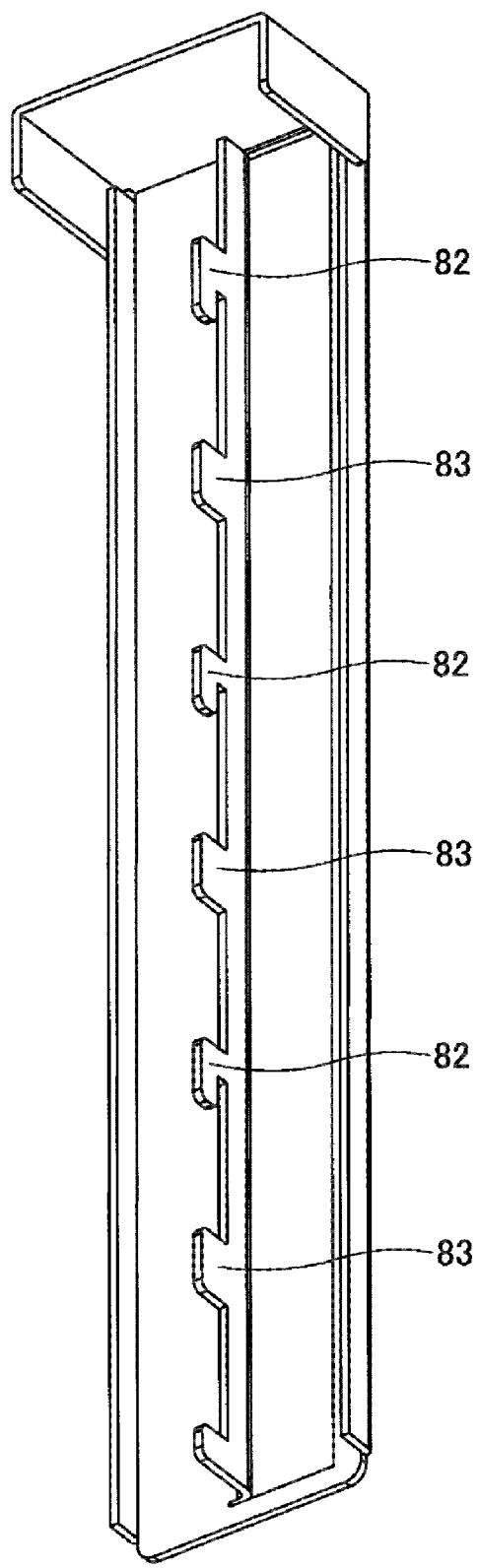
FIG. 26B is a perspective view (2) showing a modified example of the bar member according to the first embodiment.
Figure 27A:
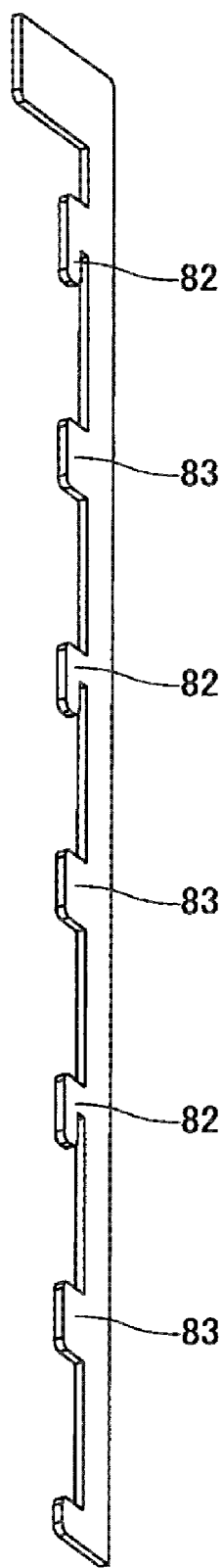
FIG. 27A is a perspective view (3) showing a modified example of the bar member according to the first embodiment.
Figure 27B:
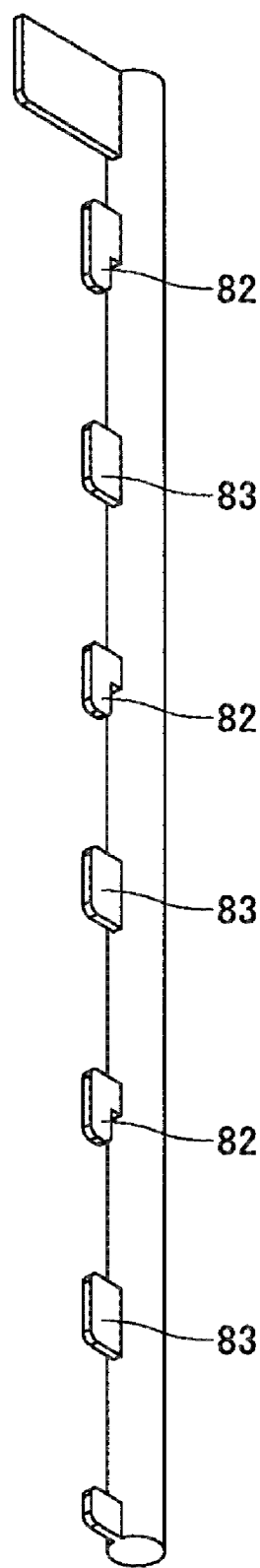
FIG. 27B is a perspective view (4) showing a modified example of the bar member according to the first embodiment.

A structure in which two lines of the first locking portions 82 and the second locking portions 83 in the length direction are provided on both ends in the width direction of the bar member 80 has been described above. However, the first locking portions 82 and the second locking portions 83 may be provided in only one line. Specifically, as shown in FIG. 26A, a bar member 80*a* in which the first locking portion 82 and the second locking portion 83 are alternately provided in the length direction on only one of two side surfaces may be employed. As shown in FIG. 26B, a bar member 80*b* in which the first locking portion 82 and the second locking portion 83 are alternately provided in the length direction in a central portion thereof may be employed. As shown in FIG. 27A, a plate-shaped bar member 80*c* in which the first locking portion 82 and the second locking portion 83 are alternately formed may be employed. As shown in FIG. 27B, a rod-shaped bar member 80*d* in which the first locking portion 82 and the second locking portion 83 are alternately formed may be employed.

Second Embodiment

A second embodiment will be described below.

Figure 28:
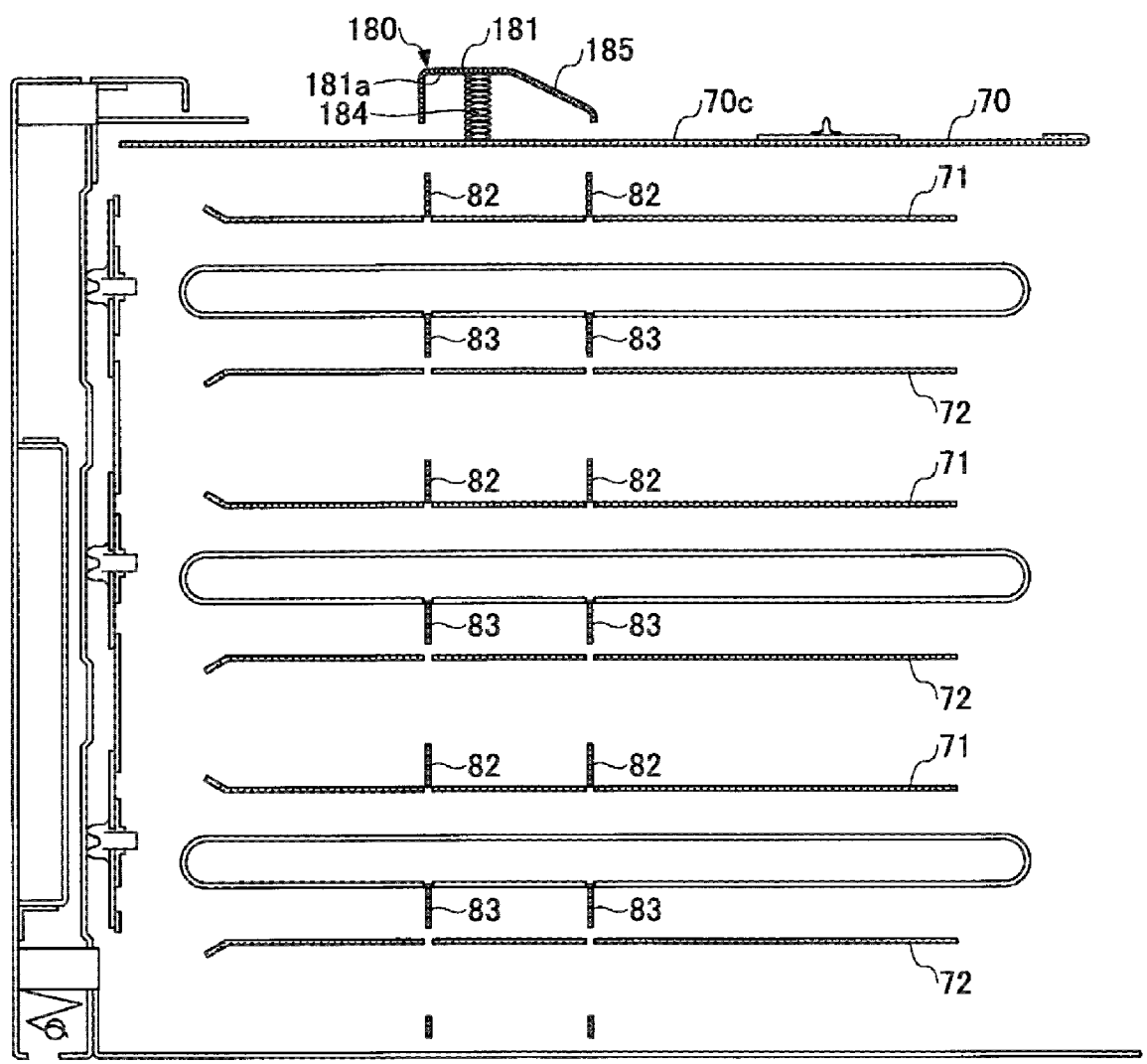
FIG. 28 is a diagram (1) showing an information processing device according to a second embodiment.

In an information processing device according to this embodiment, a spring 184 is provided between a top surface 70*c* of the drive case 70 and an inner surface 181*a* of a top portion 181 of a bar member 180 as shown in FIG. 28. The spring 184 is a coil spring or the like and applies a restoring force in a direction in which the top portion 181 of the bar member 180 is pressed upward in a state in which the spring 184 is inserted between the top surface 70c of the drive case 70 and the inner surface 181a of the top portion 181 of the bar member 180. As shown in FIG. 28 or the like, the right side of the top portion 181 of the bar member 180 includes an inclined portion 185 having an inclination which gradually goes downward as it becomes farther from the entrance side. Similarly to the first embodiment, in the bar member 180, the first locking portion 82 and the second locking portion 83 are alternately provided in the length direction at both ends in the width direction of the bar member 80.

Figure 29:
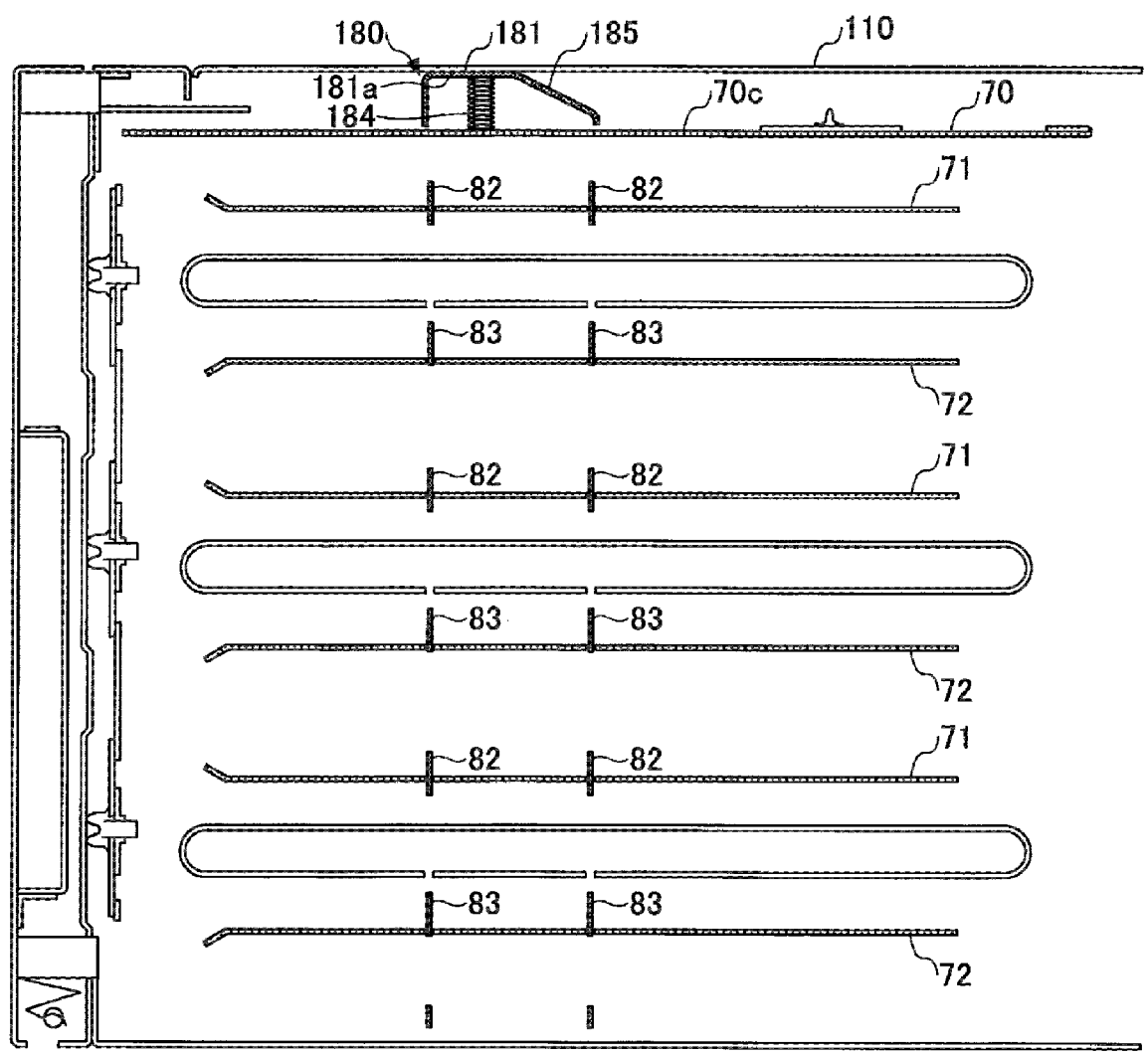
FIG. 29 is a diagram (2) showing the information processing device according to the second embodiment.
Figure 30:
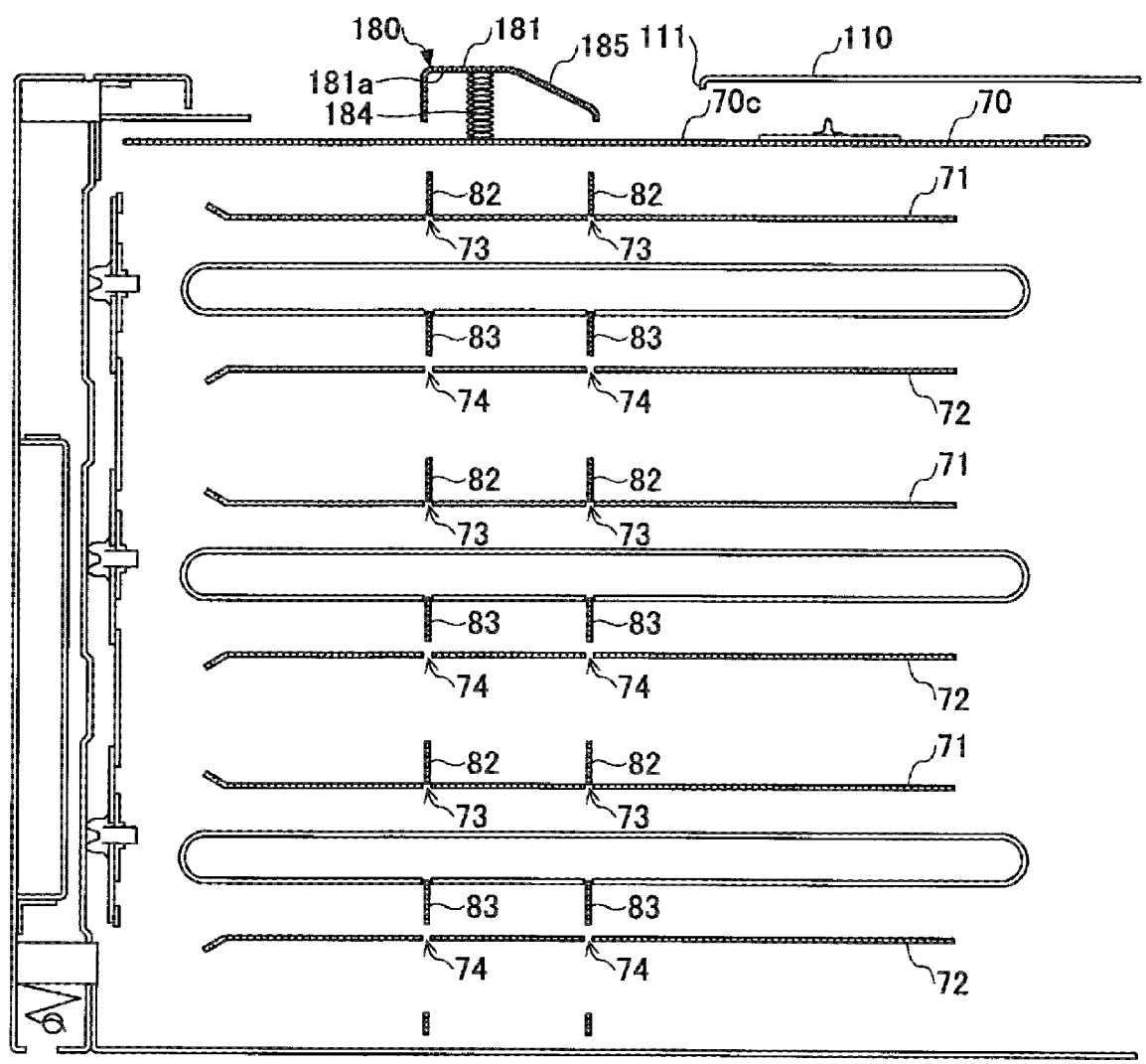
FIG. 30 is a diagram (3) showing the information processing device according to the second embodiment.
Figure 31:
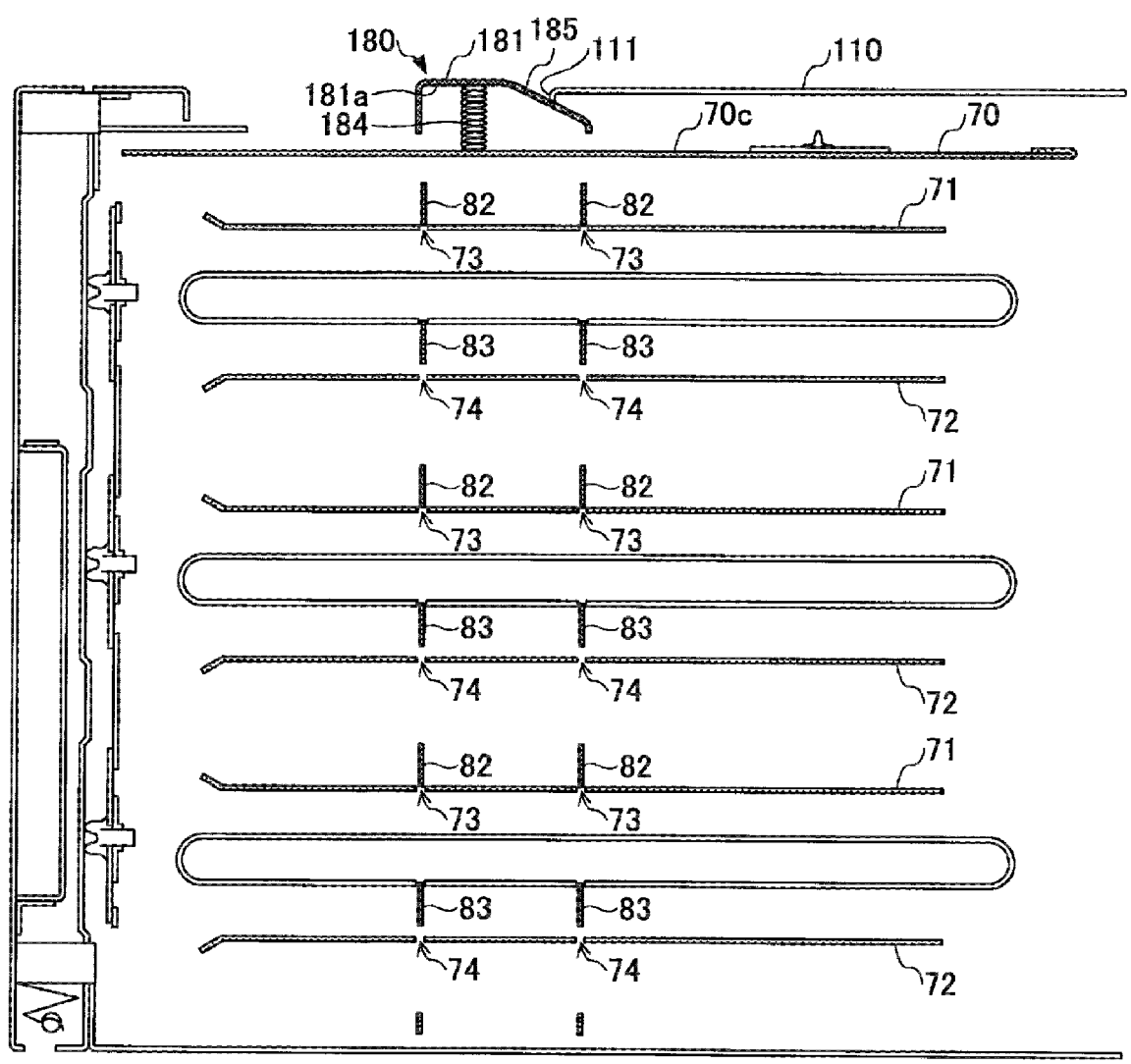
FIG. 31 is a diagram (4) showing the information processing device according to the second embodiment.

FIG. 29 shows a state in which the top cover 110 is closed in the information processing device according to this embodiment. In FIGS. 30 and 31 which will be described later along with FIG. 29, a part of the rail member 61 is not shown for the purpose of convenience. In this state, the first locking portion 82 of the bar member 180 is inserted into the first groove 73 of the first rail guide 71 of the drive case 70 and the first groove 64 of the first rail 62 of the rail member 61 which is not shown. The second locking portion 83 of the bar member 180 is inserted into the second groove 74 of the second rail guide 72 of the drive case 70 and the second groove 65 of the second rail 63 of the rail member 61 which is not shown. Accordingly, the HDD unit 60 having the rail member 61 attached thereto is fixed to the drive case 70 by the bar member 180.

Thereafter, in order to exchange the HDD unit, the top cover 110 is opened by rightward sliding as shown in FIG. 30. When the top cover 110 is opened by sliding rightward, the top cover 110 covering the top portion 181 of the bar member 180 is removed and the top portion 181 of the bar member 180 is moved upward by the restoring force of the spring 184. Accordingly, the first locking portion 82 of the bar member 180 is moved outward from the first groove 73 of the first rail guide 71 of the drive case 70 and the first groove 64 of the first rail 62 of the rail member 61 which is not shown. The second locking portion 83 of the bar member 180 is moved outward from the second groove 74 of the second rail guide 72 of the drive case 70 and the second groove 65 of the second rail 63 of the rail member 61 which is not shown. Accordingly, the HDD unit 60 having the rail member 61 attached thereto becomes detachable. That is, in this embodiment, by opening the top cover 110 without manually moving the top portion 181 of the bar member 180 upward, the bar member 180 is automatically moved upward by the restoring force of the spring 184.

Thereafter, after exchange with another HDD unit has been performed, the top cover 110 is slid leftward as shown in FIG. 31. Accordingly, a front end portion 111 of the left end of the top cover 110 comes into contact with the inclined portion 185 of the top portion 181 of the bar member 180. Thereafter, by further moving the top cover 110 leftward by sliding, the inclined portion 185 of the top portion 181 of the bar member 180 is gradually pressed by the front end portion 111 of the top cover 110 and the bar member 180 is moved downward.

Figure 32:
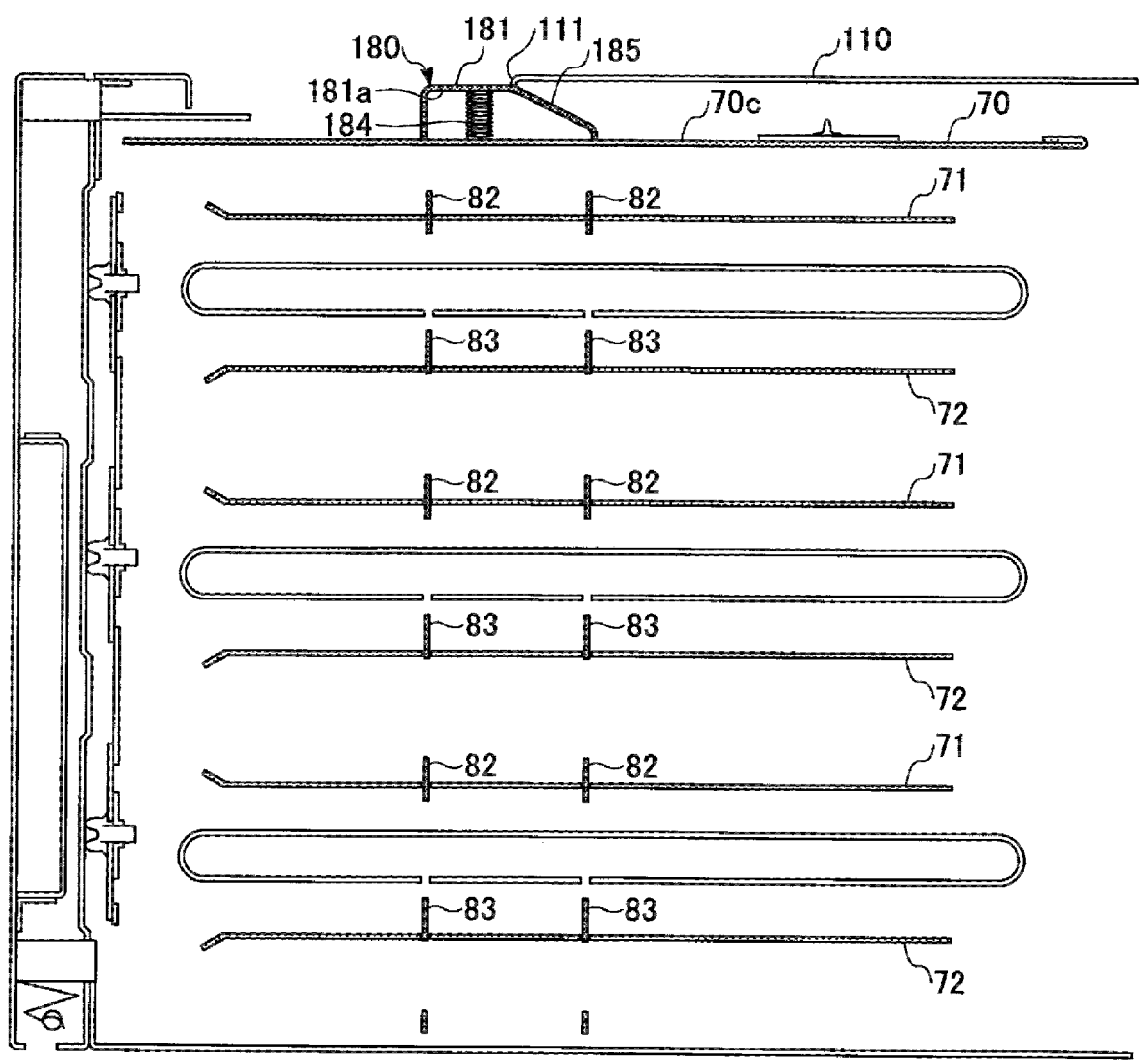
FIG. 32 is a diagram (5) showing the information processing device according to the second embodiment.

As shown in FIG. 32, the inclined portion 185 of the top portion 181 of the bar member 180 is covered with the top cover 110. In this way, in the state shown in FIG. 32, the first locking portion 82 of the bar member 180 is inserted into the first groove 73 of the first rail guide 71 of the drive case 70 and the first groove 64 of the first rail 62 of the rail member 61 which is not shown. The second locking portion 83 of the bar member 180 is inserted into the second groove 74 of the second rail guide 72 of the drive case 70 and the second groove 65 of the second rail 63 of the rail member 61 which is not shown. Accordingly, the rail member 61 of the new HDD unit is supported and fixed by the bar member 180. Thereafter, by further moving the top cover 110 leftward by sliding, the state shown in FIG. 29 is obtained and the top cover 110 is completely closed.

In this way, in this embodiment, the bar member 180 can be moved upward by the restoring force of the spring 184 by opening the top cover 110, and the bar member 180 can be moved downward by closing the top cover 110. Accordingly, it is possible to reduce the number of work process required for exchange or additional installation of an HDD unit and to perform exchange or additional installation of an HDD unit in a short amount of time.

Details other than those described above are the same as in the first embodiment.

Third Embodiment

A third embodiment will be described below.

Figure 34A:
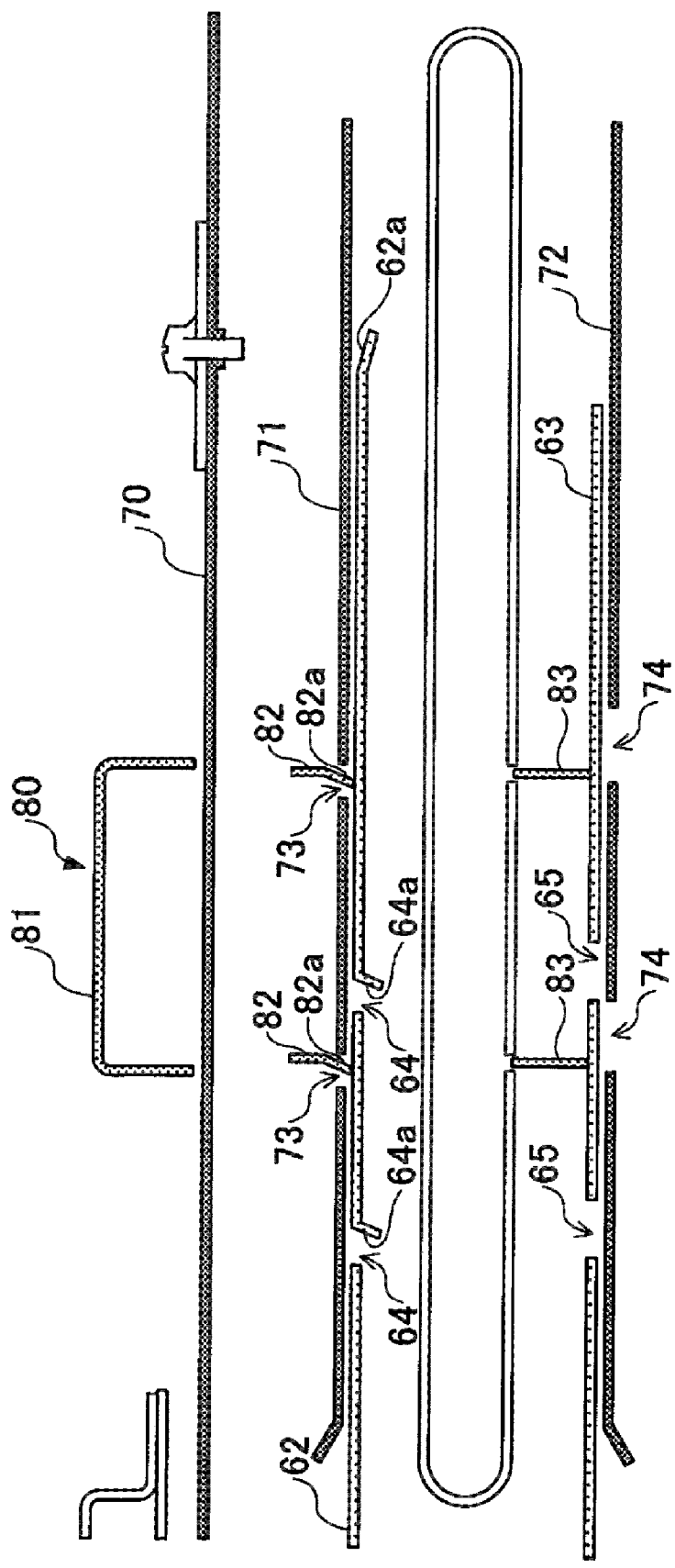
FIG. 34A is a diagram (3) showing the information processing device according to the third embodiment.
Figure 34B:
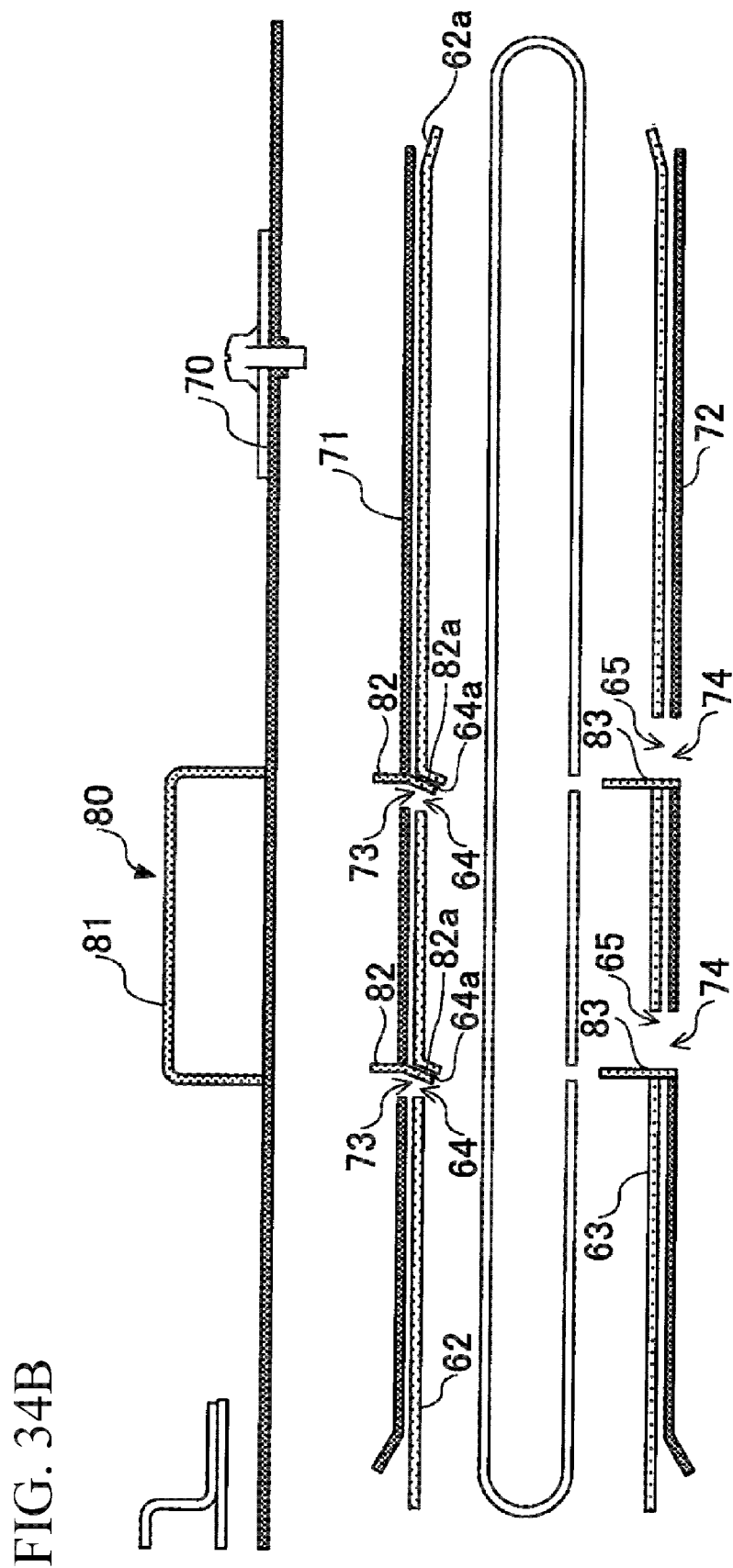
FIG. 34B is a diagram (4) showing the information processing device according to the third embodiment.
Figure 35:
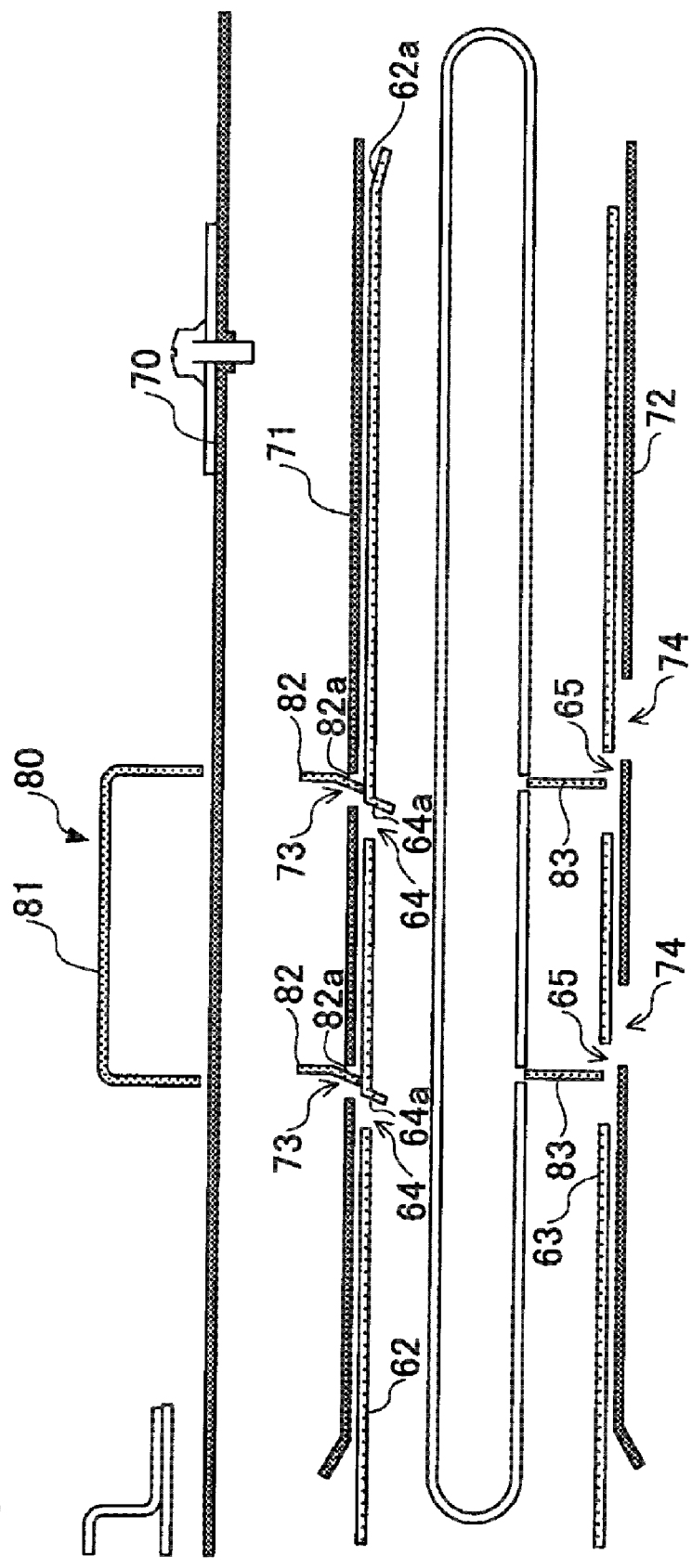
FIG. 35 is a diagram (5) showing the information processing device according to the third embodiment.

In an information processing device according to this embodiment, a bottom side of a first locking portion 82 of a bar member 80 is bent forward to form an inclined portion 82a as shown in FIGS. 33 to 35. The deepest tip of the first rail 62 of the rail member 61 is bent downward to form an inclined portion 62a. The right side of the first groove 64 is bent downward to form an inclined portion 64a. In FIGS. 33 to 35, the right is the front of the drive case 70 and the like.

A case in which the HDD unit 60 having the rail member 61 attached thereto is inserted into the drive case 70 from the left will be described below with reference to FIGS. 33 and 34.

Figure 33A:
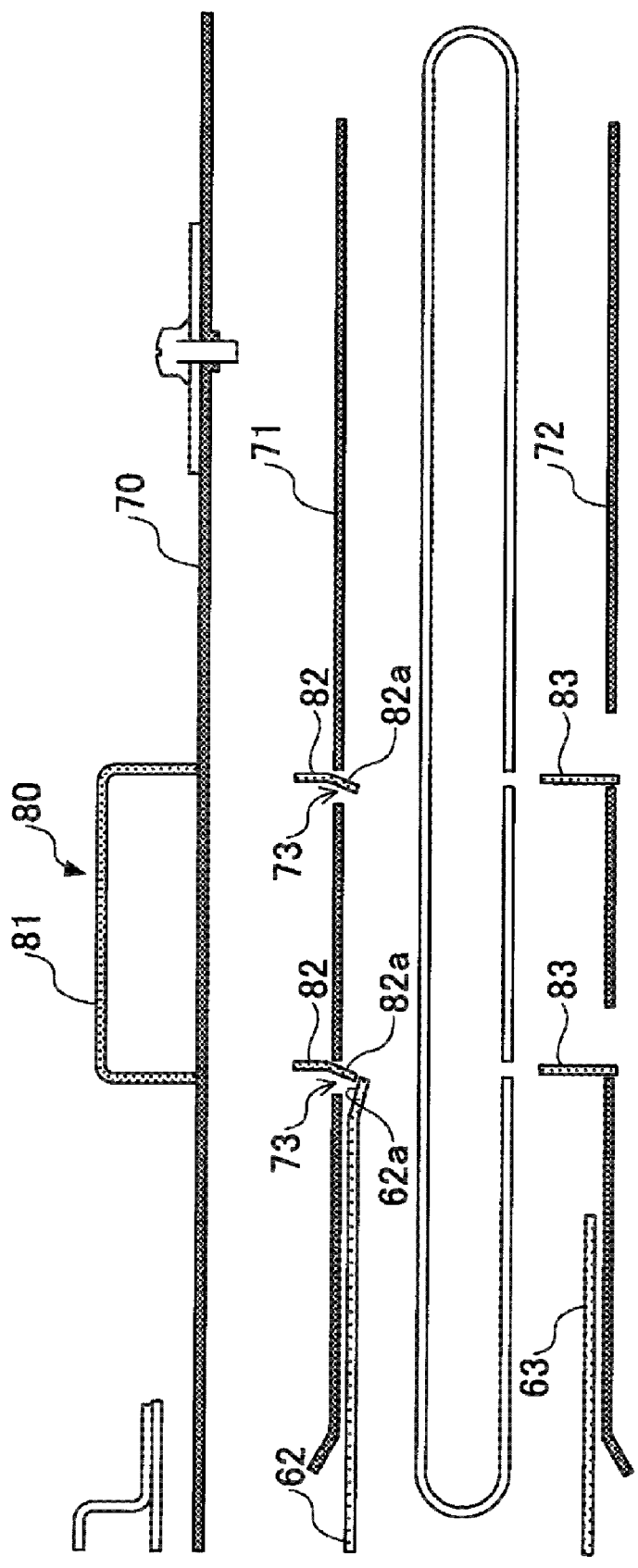
FIG. 33A is a diagram (1) showing an information processing device according to a third embodiment.
Figure 33B:
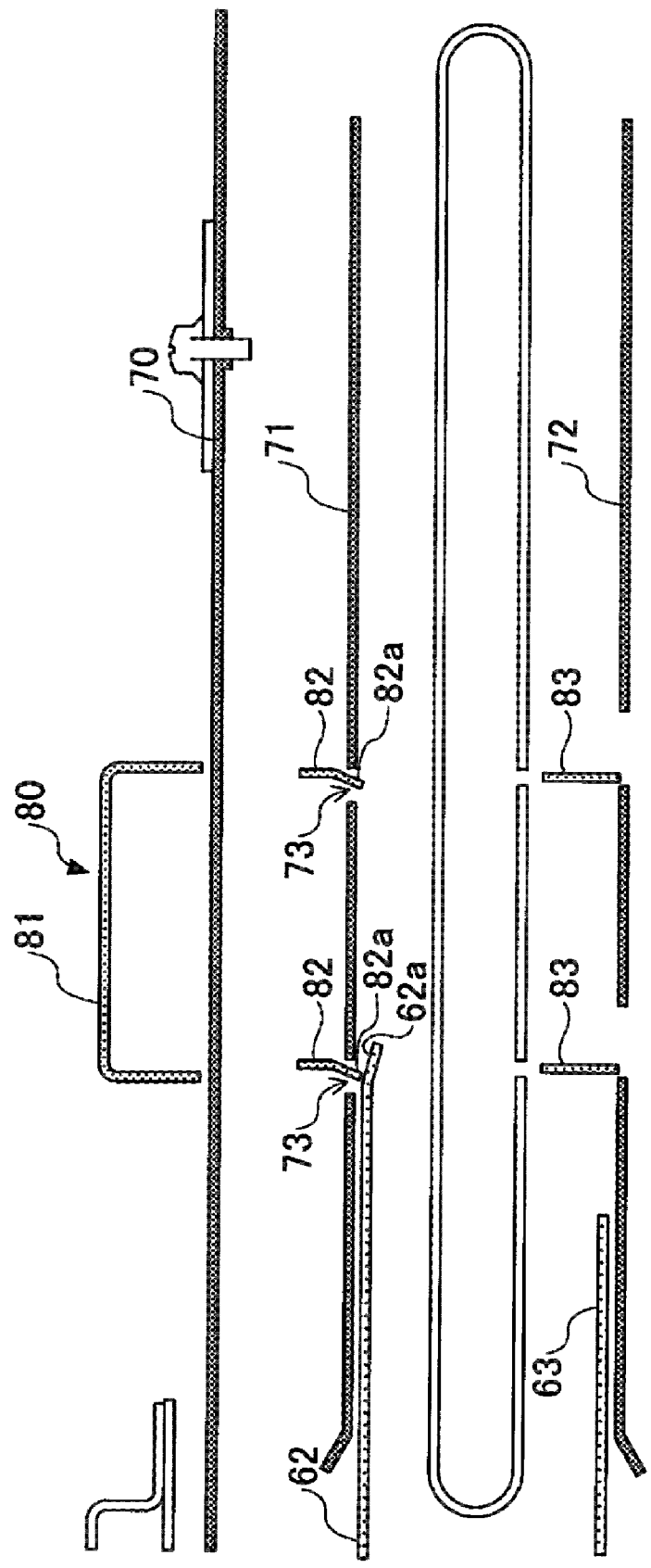
FIG. 33B is a diagram (2) showing the information processing device according to the third embodiment.

First, as shown in FIG. 33A, the HDD unit 60 having the rail member 61 attached thereto is inserted into the drive case 70 from the left. When the rail member 61 is moved rightward and the first locking portion 82 of the bar member 80 slightly protrudes from the first groove 73 of the first rail guide 71 of the drive case 70, the inclined portion 62a of the first rail 62 comes into contact with the bottom end of the first locking portion 82 of the bar member 80. By further moving the rail member 61 rightward, the bottom end of the first locking portion 82 of the bar member 80 is pressed by the inclined portion 62a of the rail member 61 and is moved upward as shown in FIG. 33B. Accordingly, even when the first locking portion 82 of the bar member 80 slightly protrudes from the first groove 73 of the first rail guide 71 of the drive case 70, the rail member 61 can be smoothly inserted.

Thereafter, by further moving the rail member 61 rightward, the rail member 61 is inserted into a predetermined position of the drive case 70 as shown in FIG. 34B after undergoing the state shown in FIG. 34A. In this state, the positions of the first groove 73 of the first rail guide 71 of the drive case 70 and the first groove 64 of the first rail 62 of the rail member 61 are aligned with each other, and the positions of the second groove 74 of the second rail guide 72 and the second groove 65 of the second rail 63 are aligned with each other. Accordingly, by moving the bar member 80 downward, the first locking portion 82 of the bar member 80 is inserted between the first groove 73 of the first rail guide 71 of the drive case 70 and the first groove 64 of the first rail 62 of the rail member 61.

At this time, when the first groove 73 of the first rail guide 71 and the first groove 64 of the first rail 62 are slightly deviated from each other, the inclined portion 82a of the first locking portion 82 of the bar member 80 and the inclined portion 64a of the first groove 64 of the first rail 62 of the rail member 61 come into contact with each other. When the bar member 80 is moved downward in this state, the inclined portion 64a of the first groove 64 of the first rail 62 of the rail member 61 is pressed rightward by the inclined portion 82a of the first locking portion 82 of the bar member 80, and the first locking portion 82 can be smoothly inserted into the first groove 64. In this embodiment, a downward force may be applied to the bar member 80 by a mechanism or the like which is not shown. In this case, the bar member 80 is automatically moved downward in the state shown in FIG. 34B.

A case in which the rail member 61 is detached from the drive case 70 will be described below with reference to FIGS. 34B and 35. Specifically, as shown in FIG. 34B, the rail member 61 is moved leftward in a state in which the inclined portion 82a of the first locking portion 82 of the bar member 80 and the inclined portion 64a of the first groove 64 of the first rail 62 of the rail member 61 are in contact with each other. Then, as shown in FIG. 35, the inclined portion 82a of the first locking portion 82 of the bar member 80 is pressed by the inclined portion 64a of the first groove 64 of the first rail 62 of the rail member 61 and the bar member 80 is moved upward. Accordingly, the rail member 61 can be smoothly detached.

Details other than described above are the same as in the first embodiment.

In the above-mentioned embodiments, an example in which the first grooves 73 and the second grooves 74 are formed in the drive case 70 and the first grooves 64 and the second grooves 65 are formed in the rail member 61 has been described above. However, holes or the like instead of the grooves may be formed in the drive case 70 and the rail member 61. Accordingly, in this specification, the first grooves 73 and the second grooves 74 in the drive case 70 and the first grooves 64 and the second grooves 65 in the rail member 61 may be referred to as openings.

While embodiments of the invention have been described above in detail, the invention is not limited to any specific embodiment and can be modified and changed in various forms within the scope described in the appended claims.

The following additional remarks are disclosed in association with the above description.

(Additional Remark 1)

An information processing device comprising:
a rail member that is attached to a drive unit;
a drive case into which the drive unit having the rail member attached thereto is inserted; and
a bar member that includes a locking portion,
wherein an opening is formed in the rail member,
wherein an opening is formed at a position in the drive case corresponding to the opening of the rail member, and
wherein the locking portion of the bar member is inserted into the opening of the rail member and the opening of the drive case in a state in which the drive unit is inserted into a predetermined position of the drive case.

(Additional Remark 2)

The information processing device according to additional remark 1, wherein a spring portion is provided on a front surface of the drive case on the side into which the drive unit is inserted,
wherein a front portion facing the front surface of the drive case is provided in the rail member, and
wherein a restoring force acts on the spring portion in a direction in which the front portion of the rail member is pushed in a state in which the drive unit is inserted into the predetermined position of the drive case.

(Additional Remark 3)

The information processing device according to additional remark 2, wherein an inclined portion which is inclined in a direction in which the bar member is inserted is provided on a side of an edge of the opening of the rail member opposite to the front portion.

(Additional Remark 4)

The information processing device according to any one of additional remarks 1 to 3, wherein a spring on which a restoring force acts in a direction in which a top surface of the drive case and a top portion of the bar member are spaced away from each other in a state in which the locking portion of the bar member is inserted into the opening of the rail member and the opening of the drive case is provided between the top surface of the drive case and the top portion of the bar member.

(Additional Remark 5)

The information processing device according to additional remark 4, wherein the top portion of the bar member is pressed downward by a top cover of a housing of the information processing device.

What is claimed is:

1. An information processing device comprising:
a rail member that is attached to a drive unit;
a drive case into which the drive unit having the rail member attached thereto is inserted; and
a bar member that includes a locking portion,
wherein an opening is formed in the rail member,
wherein an opening is formed at a position in the drive case corresponding to the opening of the rail member, and
wherein the locking portion of the bar member is inserted into the opening of the rail member and the opening of the drive case in a state in which the drive unit is inserted into a predetermined position of the drive case.

2. The information processing device according to claim 1, wherein a spring portion is provided on a front surface of the drive case on the side into which the drive unit is inserted,
wherein a front portion facing the front surface of the drive case is provided in the rail member, and
wherein a restoring force acts on the spring portion in a direction in which the front portion of the rail member is pushed in a state in which the drive unit is inserted into the predetermined position of the drive case.

3. The information processing device according to claim 2, wherein an inclined portion which is inclined in a direction in which the bar member is inserted is provided on a side of an edge of the opening of the rail member opposite to the front portion.

4. The information processing device according to claim 1, wherein a spring on which a restoring force acts in a direction in which a top surface of the drive case and a top portion of the bar member are spaced away from each other in a state in which the locking portion of the bar member is inserted into the opening of the rail member and the opening of the drive case is provided between the top surface of the drive case and the top portion of the bar member.

5. The information processing device according to claim 2, wherein a spring on which a restoring force acts in a direction in which a top surface of the drive case and a top portion of the bar member are spaced away from each other in a state in which the locking portion of the bar member is inserted into the opening of the rail member and the opening of the drive case is provided between the top surface of the drive case and the top portion of the bar member.

6. The information processing device according to claim 3, wherein a spring on which a restoring force acts in a direction in which a top surface of the drive case and a top portion of the bar member are spaced away from each other in a state in which the locking portion of the bar member is inserted into the opening of the rail member and the opening of the drive case is provided between the top surface of the drive case and the top portion of the bar member.

* * * * *